US012568370B2

(12) United States Patent
Kim et al.

(10) Patent No.: US 12,568,370 B2
(45) Date of Patent: Mar. 3, 2026

(54) METHOD AND DEVICE FOR REDUCING TERMINAL PROCESSING LOAD DUE TO INTEGRITY PROTECTION OR VERIFICATION PROCEDURE IN NEXT-GENERATION MOBILE COMMUNICATION SYSTEM

(71) Applicant: SAMSUNG ELECTRONICS CO., LTD., Suwon-si (KR)

(72) Inventors: Donggun Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 18/040,036

(22) PCT Filed: Jul. 22, 2021

(86) PCT No.: PCT/KR2021/009512
§ 371 (c)(1),
(2) Date: Jan. 31, 2023

(87) PCT Pub. No.: WO2022/025528
PCT Pub. Date: Feb. 3, 2022

(65) Prior Publication Data
US 2023/0292128 A1    Sep. 14, 2023

(30) Foreign Application Priority Data

Jul. 31, 2020    (KR) ........................ 10-2020-0095982

(51) Int. Cl.
*H04W 12/10*      (2021.01)
*H04W 76/19*      (2018.01)
*H04W 76/30*      (2018.01)

(52) U.S. Cl.
CPC ........... *H04W 12/10* (2013.01); *H04W 76/19* (2018.02); *H04W 76/30* (2018.02)

(58) Field of Classification Search
CPC ...... H04W 12/10; H04W 76/19; H04W 76/30
(Continued)

(56) References Cited

U.S. PATENT DOCUMENTS

| | | |
|---|---|---|
| 10,798,578 B2 | 10/2020 | Li et al. |
| 12,192,766 B2 | 1/2025 | Kim et al. |

(Continued)

FOREIGN PATENT DOCUMENTS

| | | |
|---|---|---|
| EP | 2528369 A1 | 11/2012 |
| EP | 3641370 A1 | 4/2020 |

(Continued)

OTHER PUBLICATIONS

International Search Report and Written Opinion of the International Searching Authority dated Dec. 1, 2021, in connection with International Application No. PCT/KR2021/009512, 10 pages.

(Continued)

*Primary Examiner* — Michael R Neff

(57) ABSTRACT

The present disclosure relates to: a communication technique that merges IoT technology with a 5G communication system for supporting higher data transmission rates than 4G systems; and a system therefor The present disclosure may be applied to intelligent services (for example, smart homes, smart buildings, smart cities, smart cars or connected cars, healthcare, digital education, retail business, security and safety-related services, etc.) on the basis of 5G communication technology and IoT-related technology. Disclosed is a terminal or a base station which executes an integrity protection function or an integrity verification function in a next-generation mobile communication system.

15 Claims, 10 Drawing Sheets

(58) Field of Classification Search
USPC ........................................................ 455/410
See application file for complete search history.

(56)                    References Cited

U.S. PATENT DOCUMENTS

| | | | |
|---|---|---|---|
| 12,432,814 | B2 | 9/2025 | Kim et al. |
| 2017/0195882 | A1* | 7/2017 | Liao ...................... H04W 76/30 |
| 2018/0359657 | A1 | 12/2018 | Kim |
| 2019/0394651 | A1 | 12/2019 | Wifvesson et al. |
| 2020/0037165 | A1 | 1/2020 | Kunz et al. |
| 2020/0137577 | A1 | 4/2020 | Li et al. |
| 2020/0169888 | A1* | 5/2020 | Yang ..................... H04L 63/205 |

FOREIGN PATENT DOCUMENTS

| | | | |
|---|---|---|---|
| KR | 10-2018-0134731 | A | 12/2018 |
| KR | 20200003120 | A | 1/2020 |
| KR | 20210016945 | A | 2/2021 |
| KR | 20220106405 | A | 7/2022 |

OTHER PUBLICATIONS

Office Action issued Feb. 11, 2025, in connection with Korean Patent Application No. 10-2020-0095982, 7 pages.
Supplementary European Search Report dated Nov. 23, 2023, in connection with European Patent Application No. 21851504.7, 7 pages.
Notice of Allowance dated Sep. 25, 2025, in connection with Korean Application No. 10-2020-0095982, 4 pages.

\* cited by examiner

METHOD AND DEVICE FOR REDUCING TERMINAL PROCESSING LOAD DUE TO INTEGRITY PROTECTION OR VERIFICATION PROCEDURE IN NEXT-GENERATION MOBILE COMMUNICATION SYSTEM

CROSS-REFERENCE TO RELATED APPLICATIONS

This application is a 371 of International Application No. PCT/KR2021/009512 filed on Jul. 22, 2021, which claims priority to Korean Patent Application No. 10-2020-0095982 filed on Jul. 31, 2020, the disclosures of which are herein incorporated by reference in their entirety.

BACKGROUND

1. Field

The disclosure relates to a terminal or base station performing integrity protection function or verification function in next-generation mobile communication system.

2. Description of Related Art

To meet the ever increasing demand for wireless data traffic since the commercialization of 4th generation (4G) communication systems, efforts have been made to develop improved 5th generation (5G) or pre-5G communication systems. As such, 5G or pre-5G communication systems are also called beyond 4G network system or post Long Term Evolution (LTE) system (Post LTE). To achieve high data rates, 5G communication systems are being considered for implementation in the extremely high frequency (mmWave) band (e.g., 60 GHz band). To decrease path loss of radio waves and increase the transmission distance in the extremely high frequency band, various technologies including beamforming, massive multiple-input multiple-output (massive MIMO), full dimensional MIMO (FD-MIMO), array antennas, analog beamforming, and large scale antennas are considered for 5G communication systems. Further, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), interference cancellation, and the like. Besides, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc. has also emerged. To implement the IoT, technology components, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as beamforming, MIMO, and the array antenna. The application of the cloud radio access network (cloud RAN) as the big data processing technology described above may also be considered as an example of the fusing of the 5G communication technology with the IoT technology.

Meanwhile, in a next-generation mobile communication system, it is required to support a data transmission method having high reliability, and there is a need to strengthen security to cope with data transmission errors or attacks from unidentified or unspecified users. In the above, the integrity protection function or the integrity verification function can be configured and used to enhance the security of data, but the data processing speed may be slowed or the data processing load may be increased due to the use of the integrity protection function or the integrity verification function in the above. Therefore, an efficient method for this is needed.

In addition, in the case that the integrity protection function or the integrity verification function is configured for data security in the above and that the integrity verification for data received from a receiving terminal or a receiving PDCP layer device fails, there is a need for a method for effectively processing the integrity verification failure.

SUMMARY

Accordingly, one object of the disclosure is to provide a method and apparatus for reducing data processing complexity or data processing load with the integrity protection function or integrity verification function when a terminal or a base station configures and performs the integrity protection function or integrity verification function in a next-generation mobile communication system.

Another object of the present invention is to provide a method and apparatus for receiving data from a bearer configured with an integrity protection function or integrity verification function, and efficiently processing received data when an integrity verification failure occurs on the received data.

In order to solve the above problems, a method performed by a transmission device in a wireless communication system according to an embodiment of the disclosure, may include determining whether to configure an integrity protection function for a radio bearer; generating configuration information for the radio bearer based on the determination; transmitting, to a reception device, a first message including the configuration information for the radio bearer; transmitting first data using the radio bearer established based on the configuration information; transmitting, to the reception device, a second message including reconfiguration information for changing whether to configure the integrity protection function; and transmitting, to the reception device, second data using the radio bearer based on the reconfiguration information.

In addition, a method performed by a reception device in a wireless communication system according to an embodiment of the disclosure may include transmitting, from a transmission device, a first message including configuration information for a radio bearer; identifying a configuration of whether an integrity protection function is configured for the radio bearer based on the configuration information; receiving first data using the radio bearer established based on the identified configuration; receiving, from the transmission device, a second message including reconfiguration information for the radio bearer, identifying whether the identified configuration is changed, based on the reconfiguration information, and receiving, from the transmission device, second data using the radio bearer, based on the identification.

In addition, a transmission device in a wireless communication system according to an embodiment of the disclosure may include a transceiver; and a controller configured to determine whether to configure an integrity protection function for a radio bearer, generate configuration information for the radio bearer based on the determination, control the transceiver to transmit a first message including the configuration information for the radio bearer to a reception device, control the transceiver to transmit first data using the radio bearer established based on the configuration information, control the transceiver to transmit a second message including reconfiguration information for changing whether to configure the integrity protection function, and control the transceiver to transmit, to the reception device, second data using the radio bearer based on the reconfiguration information.

In addition, a reception device according to an embodiment may include a transceiver; and a controller configured to: control the transceiver to transmit, from a transmission device, a first message including configuration information for a radio bearer, identify a configuration of whether an integrity protection function is configured for the radio bearer based on the configuration information, control the transceiver to receive first data using the radio bearer established based on the identified configuration, control the transceiver to receive, from the transmission device, a second message including reconfiguration information for the radio bearer, identify whether the identified configuration is changed, based on the reconfiguration information, and control the transceiver to receive, from the transmission device, second data using the radio bearer, based on the identification.

According to the present invention, when configuring or using an integrity protection function or integrity verification function in a next-generation mobile communication system, the efficient method for reducing the data processing load is proposed, thereby reducing data processing complexity and increasing the degree of freedom of configuration in implementation.

In addition, according to the disclosure, in a next-generation mobile communication system, there is an effect of enhancing security through a method for receiving data by a terminal or a base station from a bearer configured with an integrity protection function or integrity verification function, and efficiently processing received data when an integrity verification failure occurs on the received data.

BRIEF DESCRIPTION OF THE DRAWINGS

FIG. 7 is a diagram illustrating an RRC reestablishment procedure for a terminal according to the disclosure.

FIG. 9 is a diagram illustrating a structure of a terminal to which an embodiment of the disclosure is applicable.

FIG. 10 is a diagram illustrating a structure of a TRP in a wireless communication system to which an embodiment of the disclosure is applicable.

DETAILED DESCRIPTION

Figure 1:
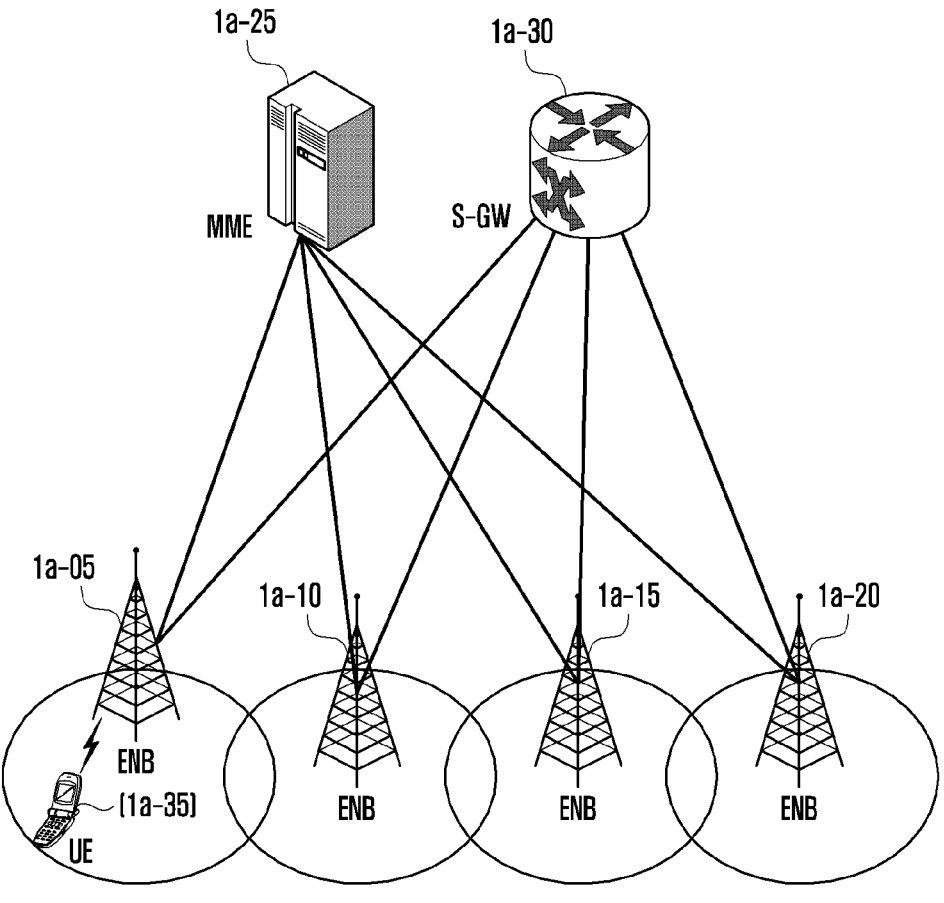
FIG. 1 is a diagram illustrating a structure of an LTE system to which the disclosure is applicable.

Hereinafter, the operating principle of the disclosure will be described in detail with reference to the accompanying drawings. In the following description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Therefore, the definitions of the terms should be made based on the contents throughout the specification.

In the following description of the disclosure, descriptions of well-known functions or structures incorporated herein may be omitted to avoid obscuring the subject matter of the disclosure hereinafter, embodiments of the disclosure will be described with reference to the accompanying drawings.

In the descriptions below, terms used for identifying access nodes, the terms indicating network layer devices, terms indicating messages, terms indicating interfaces between network layer devices, terms indicating various identification information, and the like are used for ease of description. Therefore, the disclosure is not limited by the terms provided below, and other terms that indicate subjects having equivalent technical meanings may be used.

For convenience of description, the disclosure may use terms and names defined in the 3rd-generation partnership project long term evolution (3GPP LTE) standard. However, the disclosure is not limited to the terms and the names, and may be equally applied to systems that comply with other standards. In the disclosure, eNB may be used interchangeably with gNB for convenience of description. That is, a base station described as eNB may represent gNB. Also, the term terminal may refer to not only mobile phones, NB-IoT devices, and sensors, but also other wireless communication devices.

The disclosure considers an embodiment in which an integrity protection or verification function is configured in the transmitting or receiving PDCP layer device, the transmitting PDCP layer device of the transmitting end (UE or base station) performs data transmission by applying an integrity protection procedure to the data received from an upper layer device, ciphering the data, processing the data, and delivering the data to a lower layer device, and the receiving PDCP layer device of the receiving terminal (base station or UE) deciphers the data received from a lower layer device and applies an integrity verification procedure.

In the above, the integrity protection procedure or integrity verification procedure is a procedure that has high data processing complexity and requires a lot of data processing time. Therefore, the disclosure proposes configuration methods for reducing the integrity protection function or the integrity verification function performed on transmitted data or received data.

> First configuration method: In the first configuration method, when a base station configures an integrity protection function, integrity verification function, ciphering function, or deciphering function for a UE through a radio resource control (RRC) message, the base station may configure an indicator (IntegrityProtection) for each bearer, so that the integrity protection function, integrity verification function, ciphering function, or deciphering function can be performed only for a service (or bearer) requiring the integrity protection function, integrity verification function, ciphering function, or deciphering function among a plurality of bearers (signaling radio bearers (SRBs) or data radio bearers (DRBs)). Therefore, for a service or bearer that does not require the integrity protection function, integrity verification function, ciphering function, or deciphering function as described above, the indicator may not be configured to prevent unnecessary data processing complexity or processing speed delay.

In order to minimize the complexity of implementation in the above, the base station may configure as to whether or not to use or apply the integrity protection function, integrity verification function, ciphering function, or deciphering function through the RRC message when establishing a bearer, and after the bearer is established, the base station may release, reconfigure (change whether or not to use or apply), or may not allow configure (configure whether or not to use or apply) the integrity protection function, integrity verification function, ciphering function, or deciphering function.

In another method, in the case that the integrity protection function, integrity verification function, ciphering function, or deciphering function is no longer required in the above, the base station may reconfigure the integrity protection function, integrity verification function, ciphering function, or deciphering function through the RRC message in order to reduce the complexity of data processing, so that the integrity protection function, integrity verification function, ciphering function, or deciphering function may be released or stopped. In the case that the integrity protection function, integrity verification function, ciphering function, or deciphering function is required again in the above, the base station may reconfigure the integrity protection function, integrity verification function, ciphering function, or deciphering function through the RRC message, so that the integrity protection function, integrity verification function, ciphering function, or deciphering function may be configured or resumed.

In the above, the indication for stopping (or deactivating) or resuming (or activating) the integrity protection function, integrity verification function, ciphering function, or deciphering function for each bearer may be indicated through the RRC message, medium access control (MAC) control information, radio link control (RLC) control information (RLC control PDU), or packet data convergence protocol (PDCP) control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure QoS flow identifiers mapped to the bearer, or may configure whether or not to use a SDAP header for an uplink or a downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

> Second configuration method: In the second configuration method, when the base station configures the integrity protection function, integrity verification function, ciphering function, or deciphering for the UE through the RRC message, the base station may configure whether or not to perform the integrity protection function, integrity verification function, ciphering function, or deciphering for each bearer, or for an uplink or downlink of each bearer, respectively, as an indicator (integrityProtectionUL or integrityprotectionDL or cipheringDL or cipheringUL). The base station may perform the integrity protection function, integrity verification function, ciphering function, or deciphering function only for a certain bearer or only for the downlink of each bearer, or the base station may perform the integrity protection function, integrity verification function, ciphering function, or deciphering function only for a certain bearer or only for the uplink of each bearer. Therefore, for the uplink or downlink that does not require the integrity protection function, integrity verification function, ciphering function, or deciphering function as described above, the base station may prevent unnecessary data processing complexity or processing speed delay by not configuring the indicator for each bearer.

In order to minimize the complexity of implementation in the above, the base station may configure as to whether or not to use or apply the integrity protection function, integrity verification function, ciphering function, or deciphering through the RRC message when establishing a bearer, and after the bearer is established, the base station may release, reconfigure (change whether or not to use or apply) or may not allow to configure (configure whether or not to use or apply) the integrity protection function, integrity verification function, ciphering function, or deciphering function. In another method, in the case that the integrity protection function, integrity verification function, ciphering function, or deciphering function is no longer required in the above, the base station may reconfigure the integrity protection function, integrity verification function, ciphering function, or deciphering function through the RRC message in order to reduce the complexity of data processing, so that the integrity protection function, integrity verification function, ciphering function, or deciphering function may be released or stopped. In the case that the integrity protection function, integrity verification function, ciphering function, or deciphering function is required again in the above, the base station may reconfigure the integrity protection function, integrity verification function, ciphering function, or deciphering function through the RRC message, so that the integrity protection function, integrity verification function, ciphering function, or deciphering function may be configured (or activated) or resumed.

In the above, the indication for stopping (or deactivating) or resuming (or activating) the integrity protection function, integrity verification function, ciphering function, or deciphering function for each bearer may be indicated through the RRC message, MAC control information, RLC control information (RLC control PDU), or PDCP control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or an indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure QoS flow identifiers mapped to the bearer, or may configure whether or not to use a SDAP header for an uplink or downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

Third configuration method: In the third configuration method, when the base station configures the integrity protection function, integrity verification function, ciphering function, or deciphering to the UE through the RRC message, the base station may configure whether or not to perform the integrity protection function, integrity verification function, ciphering function, or deciphering for each bearer, or for the uplink or downlink of each bearer, respectively, as an indicator (integrityProtectionUL or integrityprotectionDL or cipheringDL or cipheringUL). Thus, the base station may perform the integrity protection function, integrity verification function, ciphering function, or deciphering function only for a certain bearer or only for the downlink of each bearer, or the base station may perform the integrity protection function, integrity verification function, ciphering function, or deciphering function only for a certain bearer or only for the uplink of each bearer.

In the third configuration method, for the uplink or downlink that does not require the integrity protection function, integrity verification function, ciphering function, or deciphering function, the base station may not apply the integrity protection function, integrity verification function, ciphering function, or deciphering function in order to prevent unnecessary data processing complexity or processing speed delay. For example, for each data, the integrity protection procedure or ciphering procedure may be applied to some data, or the integrity protection procedure or ciphering procedure may not be applied to some data.

In another method, when the integrity protection function, integrity verification function, ciphering function, or deciphering function is configured through the RRC message, the indicator may be configured to apply or not to apply the integrity protection function or ciphering function for each data of an upper layer device or each QoS flow. For example, the RRC message may indicate the integrity protection function, integrity verification function, ciphering function, or deciphering function to be dynamically applied to each data as an indicator. For example, in the case that the above indicator is configured, a transmitting PDCP layer device may be implemented to apply the integrity protection procedure or ciphering procedure to some data or not to apply the integrity protection procedure or ciphering procedure to some data with respect to an upper layer device data.

In another method, through the RRC message, a protocol data unit (PDU) session, QoS flow information, or QoS flow identifier information, to which the integrity protection function, integrity verification function, ciphering function, or deciphering function may be applied, may be configured, or a PDU session, QoS flow information, or QoS flow identifier information, to which the integrity protection function, integrity verification function, ciphering function, or deciphering function may not be applied, may be configured. Therefore, the transmitting PDCP layer device may apply the integrity protection procedure or ciphering procedure to some data (e.g., data that belongs to the PDU session or QoS flow configured to be applied with the integrity protection function or ciphering function in the above, or includes the QoS flow identifier configured to be applied with the integrity protection function or ciphering function in the above) based on the configuration information. Alternatively, the transmitting PDCP layer device may not apply the integrity protection procedure or ciphering procedure for some data (e.g., data that does not belong to the PDU session or QoS flow configured to be applied with the integrity protection function or ciphering in the above, or does not include the QoS flow identifier configured to be applied with the integrity protection function or ciphering function in the above, or belongs to the PDU session or QoS flow configured not to be applied with the integrity protection function or ciphering function in the above, or includes the QoS identifier configured not to be applied with the integrity protection function or ciphering function in the above).

In addition, a 1-bit indicator of the PDCP header (e.g., 1-bit indicator for ciphering function or 1-bit indicator for integrity protection function) can be introduced and used so that a receiving terminal (e.g., a receiving PDCP layer device) can distinguish the data to which the integrity protection or ciphering is applied from the data to which the integrity protection or ciphering is not applied). In another method, a special value of a MAC-I field (e.g., a value of all 0 or a value of all 1) may be defined to distinguish the data to which the integrity protection function is applied from the data to which the integrity protection function is not applied.

In another method, in the case of not requiring the integrity protection function, integrity verification function, ciphering function, or deciphering function, the integrity protection function, integrity verification function, ciphering function, or deciphering function may be reconfigured through the RRC message in order to decrease data processing complexity, so that the integrity protection function, integrity verification function, ciphering function, or deciphering function may be released or stopped. In the case of requiring the integrity protection function, integrity verification function, ciphering function, or deciphering function again, the integrity protection function, integrity verification function, ciphering function, or deciphering function may be reconfigured through the RRC message, so that the integrity protection function or integrity verification function may be configured (or activated), or resumed.

In the above, the indication for stopping (or deactivating) or resuming (or activating) the integrity protection function, integrity verification function, ciphering function, or deciphering function for each bearer may be indicated through the RRC message, MAC control information, RLC control information (RLC control PDU), or PDCP control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or an indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure the QoS flow identifiers mapped to the bearer, or may configure whether or not to use a SDAP header for an uplink or downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

The integrity protection or verification function may be configured for each bearer configured in the UE according to the first configuration method, the second configuration method, or the third configuration method proposed in the disclosure. When the integrity protection function and integrity verification function are configured, activated, resumed, or not configured, released, deactivated, or stopped by the RRC message, MAC control information, RLC control information (RLC control PDU), or PDCP control information (PDCP control PDU) proposed in the disclosure, a method for efficiently processing a message authentication code for integrity (MAC-I) field (e.g., 4 bytes) that is added or attached at the end of the data is proposed below.

First method of processing a MAC-I field: In the first method of processing the MAC-I field, a method of processing the MAC-I field in different methods for each bearer is proposed.

In the first method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured or not applied for the SRB, the MAC-I field still exists, or the MAC-I field is added or attached at the end of the data, but the MAC-I field may be padded or filled with the padding bits configured to 0.

In the first method of processing the MAC-I field, for the DRB, in only the case that the integrity protection function or integrity verification function is configured or applied to the DRB, the MAC-I field exists for the DRB, or the MAC-I field may be added or attached at the end of the data. In the above, the MAC-I field value may be configured to a value calculated by the above-configured integrity protection function or algorithm. For example, if the integrity protection function or integrity verification function is not configured or not applied to the DRB, the MAC-I field does not exist or the MAC-I field is not added or attached at the end of the data. In the above, it may be characterized in that the integrity protection function or integrity verification function is performed or not applied to PDCP control data (e.g., PDCP state report, header compression protocol feedback, data compression protocol feedback, or configuration information). Also, it is characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Second method of processing a MAC-I field: In the second method of processing the MAC-I field, a method of processing the MAC-I field in different methods for each bearer is proposed.

In the second method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the second method of processing the MAC-I field, for the DRB, in only the case that the integrity protection function or integrity verification function is configured, activated, resumed, or applied to the DRB, the MAC-I field exists for the DRB, or the MAC-I field may be added or attached at the end of the data. In the above, the MAC-I field value may be configured to a value calculated by the above-configured integrity protection function or algorithm. For example, if the integrity protection function or integrity verification function is not configured, deactivated, stopped, released, or not applied to the DRB, the MAC-I field does not exist or the MAC-I field is not added or attached at the end of the data. In the above, after the integrity protection function or integrity verification function is configured for a certain bearer, if the integrity protection function or integrity verification function can be activated, resumed, not configured, released, deactivated, or stopped, it cannot be recognized whether the MAC-I field exists for certain data or whether the MAC-I field is attached or added at the end of the data. For example, if the integrity protection function or integrity verification function is configured or activated for a certain bearer and used, and then deactivated or stopped by the above proposed RRC message, MAC control information, RLC control information, or PDCP control information, the MAC-I field may exist up to some data among the transmitted data (or the MAC-I field is added at the end of the data), or the MAC-I field may not exist from some data among the transmitted data (or the MAC-I field is not added at the end of the data).

Therefore, when the receiving terminal receives the data, it is necessary to know whether the MAC-I field exists or does not exist for the data in order to process the data. Thus, the 1-bit indicator of the PDCP header may indicate whether the MAC-I field exists, whether the integrity protection function is applied, or whether the integrity verification function (or bypass) is applied. In another method, the 1-bit indicator of the PDCP header may be defined and used as a toggle bit. For example, if the integrity protection function is applied, activated, resumed, or changed, the 1-bit indicator of the PDCP header is configured to 1 (or 0) continuously, if the integrity protection function is deactivated, stopped, released, or not applied, the 1-bit indicator of the PDCP header may be configured to 0 (or 1) continuously.

In another method, the PDCP control information may be newly defined to know whether the MAC-I field exists or does not exist for the data received by the receiving terminal, and the PDCP control information may be transmitted by including the PDCP serial number or COUNT value of data where the MAC-I field exists or does not exist lastly (or data where the MAC-I field does not exist or exists for the first time). Alternatively, the PDCP control information may be transmitted by including the PDCP serial number or COUNT value of the first data (or last data) for which the presence or absence of the MAC-I field is changed or for which the application or non-application of the integrity protection function is changed. In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Third method of processing a MAC-I field: In the third method of processing the MAC-I field, a method of processing the MAC-I field in different methods for each bearer is proposed.

In the third method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with the padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the third method of processing the MAC-I field, for the DRB, in only the case that the integrity protection function or integrity verification function is configured to the DRB, the MAC-I field exists or the MAC-I field may be added or attached at the end of the data. In the above, the MAC-I field value may be configured to a value calculated by the above-configured integrity protection function or algorithm. In the above, after the integrity protection function or integrity verification function is configured for a certain bearer, if the integrity protection function or integrity verification function can be activated, resumed, not configured, released, deactivated, or stopped, or even if the integrity protection function or integrity verification function can be activated, resumed, not configured, released, deactivated, or stopped, the MAC-I field always exists for the certain barrier or the MAC-I field may be attached or added at the end of the data. For example, if the integrity protection function or integrity verification function is configured, stopped, released, deactivated, or not applied for the DRB, the MAC-I field still exists, or the MAC-I field is added or attached at the end of the data, but the MAC-I field may be padded or filled with the padding bits configured to 0.

In another method, the MAC-I field may be defined as a special value other than the above padding bits configured to 0 and may be used to indicate that the integrity protection function is not applied. If the integrity protection function or integrity verification function is configured, activated, resumed, or applied for the DRB, the MAC-I field may exist, or the MAC-I field may always be added or attached at the end of the data, and the MAC-I field value may be configured to a value calculated by the above configured integrity protection function or algorithm. Therefore, the receiving terminal first identifies the MAC-I field value and identifies whether the MAC-I field is filled with the padding bits configured to 0 or has a defined special value. If the MAC-I field value is not filled with the padding bits configured to 0, or does not have a defined special value, the integrity verification procedure can be performed. If the MAC-I field value is filled with the padding bits configured to 0 or has a defined special value, the integrity verification function may not be performed. For example, if the integrity protection function or integrity verification function is configured or activated for a certain bearer and used, and then deactivated or stopped by the proposed RRC message, MAC control information, RLC control information, or PDCP control information, the MAC-I field may exist up to some data among the transmitted data (or the MAC-I field is added at the end of the data), or the MAC-I field may exist from some data among the transmitted data but may have the value padded as 0 or a special value.

Therefore, when the receiving terminal receives the data, it is necessary to know whether the MAC-I field has the value padded as 0 or a special value for the date in order to process the data, so the MAC-I field value may be identified first. In another method, the 1-bit indicator of the PDCP header may indicate whether the MAC-I field is configured with a special value, or whether the integrity protection function is applied, or whether the integrity verification function (or bypass) is applied. In another method, the 1-bit indicator of the PDCP header may be defined and used as a toggle bit. For example, if the integrity protection function is applied, activated, resumed, or changed, the 1-bit indicator of the PDCP header is configured to 1 (or 0) continuously, if the integrity protection function is deactivated, stopped, released, or not applied, the 1-bit indicator of the PDCP header may be configured to 0 (or 1) continuously.

In another method, the PDCP control information may be newly defined to know whether the MAC-I field has a special value for the data received by the receiving terminal in the above, and the PDCP control information may be transmitted by including the PDCP serial number or COUNT value of data where the MAC-I field has a special value lastly (or data where the MAC-I field with a special value exists for the first time). Alternatively, the PDCP control information may be transmitted by including the PDCP serial number or COUNT value of the first data (or last data) for which the application or non-application of the integrity protection function is changed. In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Fourth method of processing a MAC-I field: In the fourth method of processing the MAC-I field, a method of processing the MAC-I field in different methods for each bearer is proposed.

In the fourth method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with the padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the fourth method of processing the MAC-I field, for the DRB, in the case that the integrity protection function or integrity verification function is configured to the DRB, or in the case that the integrity protection function is applied to data, the MAC-I field exists for the data, or the MAC-I field may be added or attached at the end of the data. In the above, the MAC-I field value may be configured to a value calculated by the above-configured integrity protection function or algorithm. For example, if the integrity protection function or integrity verification function is not configured for the DRB, or the integrity protection function is not applied to data, the MAC-I field does not exist for the data, or the MAC-I field may not be added or attached at the end of the data. For example, the integrity protection function may be applied or not applied to each data based on the PDU session information, QoS flow identifier information, QoS flow information, or upper layer device information configured through the RRC message proposed in the disclosure, and in only the case of application of the integrity protection function, the value of the MAC-I field can be calculated and the MAC-I field can be attached at the end of the data. In addition, the 1-bit indicator of the PDCP header may indicate whether the integrity protection function is applied to the data or whether the MAC-I field exists.

In another method, after the integrity protection function or integrity verification function is configured for a certain bearer in the above, if the integrity protection function or integrity verification function may be activated, resumed, not configured, released, deactivated, or stopped, or if the integrity protection function may be applied to some data or is not applied to some data, or even if the integrity protection function or integrity verification function may be activated, resumed, not configured, released, deactivated, or stopped, or even if the integrity protection function may be applied to some data or not applied to some data, the MAC-I field always exists, or the MAC-I field may be added or attached at the end of the data. For example, if the integrity protection function or integrity verification function is configured, stopped, released, deactivated, not applied for the DRB, or even if the integrity protection function is not applied to some data, the MAC-I field still exists, or the MAC-I field is added or attached at the end of the data, but the MAC-I field may be padded or filled with the padding bits configured to 0.

In another method, the MAC-I field may be defined as a special value other than the above padding bits configured to 0 and may be used to indicate that the integrity protection function is not applied. If the integrity protection function or integrity verification function is configured, activated, resumed, or applied for the DRB, or the integrity protection function is applied for some data, the MAC-I field may exist, or the MAC-I field may always be added or attached at the end of the data, and the MAC-I field value may be configured to a value calculated by the above configured integrity protection function or algorithm. Therefore, the receiving terminal first identifies the MAC-I field value and identifies whether the MAC-I field is filled with the padding bits configured to 0 or has a defined special value. If the MAC-I field value is not filled with the padding bits configured to 0, or does not have a defined special value, the integrity verification procedure can be performed. If the MAC-I field value is filled with the padding bits configured to 0 or has a defined special value, the integrity verification function may not be performed.

Therefore, when the receiving terminal receives the data, it is necessary to know whether the MAC-I field has the value padded as 0 or a special value for the date in order to process the data, so the MAC-I field value may be identified first. In another method, the 1-bit indicator of the PDCP header may indicate whether the MAC-I field is configured with a special value, or whether the integrity protection function is applied, or whether the integrity verification function (or bypass) is applied. In another method, the 1-bit indicator of the PDCP header may be defined and used as a toggle bit. In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header. Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

The ciphering function, deciphering function, integrity protection function, or integrity verification function proposed in the disclosure may be extended and configured and used in a MAC layer device. For example, whether to use the ciphering function, deciphering function, integrity protection function, or integrity verification function for the MAC layer device may be configured as an indicator through the RRC message, respectively. In addition, separate security configuration information (e.g., a security key or a security algorithm) for the ciphering function, deciphering function, integrity protection function, or integrity verification function may be configured in the MAC layer device through the RRC message.

In the above, in the case that the ciphering function, deciphering function, integrity protection function, or integrity verification function is configured in the MAC layer device, the MAC layer device performs the integrity protection function or ciphering function on data or MAC control information received from an upper layer device, and may transmit the data by including the data in an uplink transmission resource. Also, the MAC layer device may perform the deciphering function or integrity verification function on the data or MAC control information received from a lower layer device, demultiplex the data or MAC control information and transmit the demultiplexed data or MAC control information to the upper layer device.

In the above, the data (e.g., MAC PDU) transmitted from the MAC layer device may have a structure in which upper layer data is placed at the very front, and MAC control information generated by the MAC layer device is placed at the very end, and in the case that an uplink transmission resource remains, the data may have a structure in which padding is added at the very end. For example, the data may have the following structure: [MAC header | upper layer data (e.g., MAC SDU)] [MAC header | upper layer data (e.g., MAC SDU)] . . . [MAC header | upper layer data (e.g., MAC SDU)] [MAC header | MAC control information (e.g., BSR or PHR)] [MAC header | MAC control information (e.g., BSR or PHR)] . . . [MAC header | MAC control information (e.g., BSR or PHR)][MAC header for padding | Padding].

In the above structure, if the ciphering function or integrity protection function is configured in the MAC layer device, methods for efficiently performing the ciphering function or integrity protection function on the data (e.g., MAC PDU) are proposed as follows.

First method of applying a ciphering function or integrity protection function in a MAC layer device: If the ciphering function or integrity protection function is configured in the MAC layer device, the data (RLC PDU or MAC SDU) received from each logical channel (or RLC layer device) and the MAC control information required to be transmitted by the MAC layer device are generated, and multiplexed as in the data (e.g., MAC PDU) structure described above, the ciphering function or integrity protection function may be applied to the multiplexed data. For example, it is possible to generate a MAC header for each data (RLC PDU or MAC SDU), generate a MAC header for MAC control information, and apply the ciphering procedure to all multiplexed data (e.g., MAC PDU). Alternatively, the integrity protection procedure may be applied to the all data (e.g., MAC PDU), and the MAC-I field may be added and attached at the end of the all data. For example, in the case that the ciphering procedure or integrity protection procedure is applied as described above, the structure of the data (e.g., MAC PDU) transmitted from the MAC layer device or transmitted to the lower layer device may have the following structure of [MAC header | upper layer data (e.g., MAC SDU)] [MAC header | upper layer data (e.g., MAC SDU)] . . . [MAC header | upper layer data (e.g., MAC SDU)] [MAC header | MAC control information (e.g., BSR or PHR)] [MAC header | MAC control information (e.g., BSR or PHR)] . . . [MAC header | MAC control information (e.g., BSR or PHR)][MAC header for padding | Padding] [MAC-I field].

In another method, the MAC-I field may be located at the very front of the all data or may be included in the MAC header. In another method, the MAC layer device transmits the all data to the PDCP layer device of a specific bearer when performing the ciphering procedure or integrity protection procedure for the all data in the above, so that the ciphering procedure or integrity protection procedure for the all data is performed in the PDCP layer device. The PDCP layer device may transmit the data to which the ciphering procedure or integrity protection is applied to the MAC layer device, and the MAC layer device may transmit the data.

The first method of applying the ciphering function or integrity protection function in the MAC layer device proposed above can have an advantage of reducing the overhead because the ciphering procedure or integrity protection procedure is applied to all data and only one MAC-I field is added. In the above, the ciphering procedure or integrity protection procedure may be applied to the MAC header for padding or padding data. In another method, processing complexity may be reduced by not applying the ciphering procedure or integrity protection procedure to the MAC header for padding or padding data.

Second method of applying a ciphering function or integrity protection function in a MAC layer device: If the ciphering function or integrity protection function is configured in the MAC layer device, the ciphering function or integrity protection function may be applied for each data (RLC PDU or MAC SDU) received from each logical channel (or an RLC layer device). For example, it is possible to apply the ciphering procedure to the above each data (RLC PDU or MAC PDU). Alternatively, the integrity protection procedure may be applied to the above data and MAC header, and the MAC-I field may be added and attached at the end of the data. In addition, the ciphering procedure or integrity protection procedure can be applied to each MAC control information. In the case of applying the integrity protection procedure, the integrity protection procedure is applied to the MAC header and the MAC control information, and the MAC-I field may be added or attached at the end of the data. For example, in the case of applying the ciphering procedure or integrity protection procedure as described above, the data (e.g., MAC PDU) transmitted from the MAC layer device or transmitted to the lower layer device may have the following structure of [MAC header | upper layer data (e.g., MAC SDU) | MAC-I field] [MAC header | upper layer data (e.g., MAC SDU) | MAC-I field] . . . [MAC header | upper layer data (e.g., MAC SDU) | MAC-I field] [MAC header | MAC control information (e.g., BSR or PHR) | MAC-I field] [MAC header | MAC control information (e.g., BSR or PHR) | MAC-I field] . . . [MAC header | MAC control information (e.g., BSR or PHR)][MAC header for padding | padding | MAC-I field]. In another method, processing complexity may be reduced by not applying the ciphering procedure or integrity protection procedure to the MAC header for padding or padding data.

In another method, when performing the ciphering procedure or integrity protection procedure for each data (e.g., RLC PDU or MAC SDU) in the above, the MAC layer device transmits the data to the PDCP layer device of a specific bearer. The ciphering procedure or integrity protection procedure is performed in the PDCP layer device, the PDCP layer device transmits the data to which the ciphering procedure or integrity protection is applied to the MAC layer device, and the MAC layer device multiplexes the data to constitute the MAC PDU and transmit the constituted MAC PDU.

The second method of applying the ciphering function or integrity protection function in the MAC layer device proposed above applies the ciphering function or integrity protection function to each upper layer device data (MAC SDU), so there is an advantage of performing the data processing in advance for each data. Since the same procedure can be repeatedly performed for each data, hardware implementation can be facilitated.

Third method of applying a ciphering function or integrity protection function in a MAC layer device: If the ciphering function or integrity protection function is configured in the MAC layer device, the ciphering function or integrity protection function may not be applied to each data (RLC PDU or MAC SDU) received from each logical channel (or an RLC layer device). However, since the MAC control information includes important information for controlling the MAC layer device or the PHY layer device, the ciphering procedure can be applied to the MAC control information or the integrity protection procedure can be applied to the MAC control information and the MAC header. When the ciphering procedure or integrity protection procedure is applied to the MAC control information in the above, the ciphering procedure or integrity protection procedure can be applied to all MAC control information or a group of MAC control information included in one MAC PDU at once. Therefore, the MAC-I field may be added and attached to the very end of the entire MAC control information. For example, in the case of applying the ciphering procedure or integrity protection procedure as described above, the data (e.g., MAC PDU) transmitted from the MAC layer device or transmitted to the lower layer device may have the following structure of [MAC header | upper layer data (e.g., MAC SDU)] [MAC header | upper layer data (e.g., MAC SDU)] . . . [MAC header | upper layer data (e.g., MAC SDU)] [MAC header | MAC control information (e.g., BSR or PHR)] [MAC header | MAC control information (e.g., BSR or PHR)] . . . [MAC header | MAC control information (e.g., BSR or PHR)][MAC header for padding | Padding] [MAC-I field]. In the above, the ciphering or integrity protection procedure may be applied including the header for padding or padding.

In another method, processing complexity may be reduced by not applying the ciphering procedure or integrity protection procedure to the MAC header for padding or padding data. In another method, the MAC layer device transmits the data to the PDCP layer device of a specific bearer when performing the ciphering procedure or integrity protection procedure on the MAC control information, and the ciphering procedure or integrity protection procedure for the MAC control information is performed in the PDCP layer device. The PDCP layer device transmits the MAC control information to which the ciphering procedure or integrity protection is applied to the MAC layer device, and the MAC layer device multiplexes the MAC control information with other data to constitute the MAC PDU and transmits the constituted MAC PDU.

Since the third method of applying the ciphering function or integrity protection function in the MAC layer device proposed above applies the ciphering function or integrity protection function to a group of MAC control information or the entire MAC control information, overhead due to the MAC-I field can be reduced. In the above, the MAC-I field may be located at the very front of the MAC control information, at the very front of the MAC PDU, or included in the MAC header. For example, if the MAC-I field is located at the very front, the receiving terminal can identify the MAC-I field value first, thereby shortening the processing time.

Fourth method of applying a ciphering function or integrity protection function in a MAC layer device: If the ciphering function or integrity protection function is configured in the MAC layer device, the ciphering function or integrity protection function may not be applied to each data (RLC PDU or MAC SDU) received from each logical channel (or an RLC layer device). However, since the MAC control information includes important information for controlling the MAC layer device or the PHY layer device, the ciphering procedure can be applied to each MAC control information, or the integrity protection procedure may be applied for each MAC control information and each MAC header. In the above, when the ciphering procedure or integrity protection procedure is applied to the MAC control information, the ciphering procedure or integrity protection procedure may be applied to each MAC control information included in one MAC PDU, respectively. Therefore, the MAC-I field can be added and attached to the back (or front) of each MAC control information. For example, in the case of applying the ciphering procedure or integrity protection procedure as described above, the data (e.g., MAC PDU) transmitted from the MAC layer device or transmitted to the lower layer device may have the following structure of [MAC header | upper layer data (e.g., MAC SDU)] [MAC header | upper layer data (e.g., MAC SDU)] . . . . [MAC header | upper layer data (e.g., MAC SDU)] [MAC header | MAC control information (e.g., BSR or PHR) | MAC-I field] [MAC header | MAC control information (e.g., BSR or PHR) | MAC-I field] . . . [MAC header | MAC control information (e.g., BSR or PHR) | MAC-I field] [MAC header for padding | padding]. In the above, the ciphering or integrity protection procedure may be applied including a header for padding or padding.

In another method, processing complexity may be reduced by not applying the ciphering procedure or integrity protection procedure to the MAC header for padding or padding data. In another method, the MAC layer device transmits the MAC control information to the PDCP layer device of a specific bearer when performing the ciphering procedure or integrity protection procedure on the MAC control information in the above, so that the ciphering procedure or integrity protection procedure for the MAC control information is performed in the PDCP layer device. The PDCP layer device transmits the MAC control information to which the ciphering procedure or integrity protection is applied to the MAC layer device, and the MAC layer device multiplexes the MAC control information with other data to constitute the MAC PDU and transmits the constituted MAC PDU.

The fourth method of applying the ciphering function or integrity protection function in the MAC layer device proposed above applies the ciphering function or integrity protection function to each MAC control information, so that there is an advantage in that data processing can be performed in advance for each MAC control information, and since the same procedure can be repeatedly performed for each MAC control information, hardware implementation can be facilitated. In the above, the MAC-I field may be located at the very front of the MAC control information or included in the MAC header. For example, if the MAC-I field is located at the very front of the MAC control information, the receiving terminal can identify the MAC-I field value first, thereby shortening the processing time.

In the above, in the case that the transmitting PDCP layer device (or a MAC layer device) is configured with all of the integrity protection function, integrity verification function, ciphering function, and deciphering function, the integrity protection procedure may be performed for the upper layer device data or MAC control information or a corresponding PDCP header (or a MAC header), and the ciphering procedure may be performed together for the upper layer device data and the MAC-I field generated by the integrity protection procedure. In the above, the transmitting PDCP layer device performs the same procedure as above for SDAP user data (SDAP data PDU), and in the case that the SDAP header is configured, the integrity protection procedure is applied to the SDAP header, and the ciphering procedure may not be applied to the SDAP header.

Also, in the above, the transmitting PDCP layer device may apply the integrity protection procedure to the SDAP control data (SDAP control PDU) and may not apply the ciphering procedure to the SDAP control data.

In addition, in the above, the transmitting PDCP layer device may not apply the integrity protection procedure nor the ciphering procedure to the PDCP control data (PDCP control PDU). In the case that the integrity protection function, integrity verification function, ciphering function, and deciphering function are all configured in the MAC layer device, the methods for applying the ciphering function or integrity protection function in the MAC layer device proposed above may be applied.

In the above, when the receiving PDCP layer device receives data from a lower layer device, the receiving PDCP layer device may apply the deciphering procedure or perform an integrity verification procedure. If the indicator indicated in the PDCP header indicates the PDCP control data, the above procedures may not be applied. If the indicator indicated in the SDAP header indicates the SDAP control data, the deciphering procedure may not be performed and the integrity verification procedure may be performed.

In the above, when the MAC layer device receives data from the lower layer device, the MAC layer device may apply the deciphering procedure or perform the integrity verification procedure. According to the methods of applying the ciphering function or integrity protection function in the MAC layer device proposed above, the MAC layer device may identify the MAC header, and may determine whether or not to apply the deciphering procedure or integrity verification procedure to the MAC SDU or MAC control information. For example, in the third method or the fourth method in which the MAC layer device applies the ciphering function or integrity protection function, the MAC layer device reads the MAC header and applies the deciphering procedure or integrity verification procedure only to the MAC control information.

In another method, a field indicating whether the integrity protection function or ciphering function is applied may be introduced and used in the MAC header or the PDCP header.

If the integrity protection function or ciphering function is configured in the MAC layer device in the above, when the UE transmits a preamble in the random access procedure and the base station transmits a random access response to the UE in response thereto, the MAC layer device applies the integrity protection function or ciphering function to the random access response, and the procedures proposed in the disclosure may be extended and applied. For example, the integrity protection function or ciphering function may be applied to prevent the temporary terminal identifier (Temporary C-RNTI) included in the random access response from being exposed to an unspecified number. In addition, the UE may receive the random access response and apply the deciphering procedure or integrity verification procedure to the random access response.

In addition, the receiving PDCP layer device may not apply the above procedures if the indicator indicated in the PDCP header indicates the PDCP control data. If the indicator indicated in the SDAP header indicates the SDAP control data, the deciphering procedure may not be performed and the integrity verification procedure may be performed. In another method, the disclosure proposes that neither integrity protection nor ciphering procedure is applied to the SDAP control data in order to simplify implementation through unified data processing. In another method, the integrity protection or ciphering procedures may also be applied to the SDAP control data.

The disclosure proposed above can be extended to the case where the base station broadcasts system information, and after applying the ciphering or integrity protection procedure to the system information, the ciphered or integrity-protected system information can be broadcast. In an IDLE mode state or INACTIVE mode state, if the UE receives system information from a camped-on cell (e.g., a suitable cell) and the integrity verification procedure for the received system information fails, the UE leaves the camped-on cell and may perform a cell selection procedure or cell reselection procedure again. Alternatively, when performing the cell selection procedure or cell reselection procedure in the above, the cell selection procedure or cell reselection procedure may be performed except for the cell (or frequency) that broadcasts the system information that has failed the integrity verification procedure. Because the signal strength of the base station that induces terminal access with wrong system information with malicious intent will always be strong, the base station is excluded from the cell selection or reselection procedure to prevent the UE from accessing the malicious base station, so that security can be improved.

In addition, when the integrity protection function or integrity verification function is configured, in the case that the integrity verification failure occurs for the data received from the receiving PDCP layer device or MAC layer device, the disclosure proposes a method of efficiently processing an integrity verification failure. In the above, when integrity verification failure occurs, different processing methods for each bearer (e.g., SRB or DRB) are proposed below.

A first method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or a MAC layer device) may indicate the integrity verification procedure failure (integrity verification failure or integrity check failure) to an upper layer device (e.g., an RRC layer device).

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded.

1> If the RRC layer device receives an integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

A second method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or the MAC layer device) may indicate the integrity verification failure procedure (integrity verification failure or integrity check failure) to the upper layer device (e.g., the RRC layer device). In the above, if the integrity verification failure occurs and the PDCP layer device is connected to the DRB, when the integrity verification failure occurs more than a predetermined number of times, the upper layer device may be instructed. For example, a first variable may be newly introduced in order to identify whether the number of occurrence of integrity verification failures is greater than or equal to a predetermined number of times, and each time the integrity verification failure occurs for the received data, the value of the first variable may be increased by 1, and if the variable value is greater than or equal to the predetermined number of times, the integrity verification failure may be indicated to the upper layer device. In addition, when the integrity verification failure is indicated in the upper layer device, the value of the first variable may be initialized to 0. In the above, the predetermined number of times may be configured through the RRC messages for each bearer or for each uplink or downlink. In the above method, since it is not necessary to continuously perform an indication for the integrity verification failure that occurs continuously to the upper layer device, the processing load can be reduced.

In another method, if the integrity verification failure occurs and the PDCP layer device is connected to the DRB, the upper layer device may be instructed only once for multiple integrity verification failures occurring within a predetermined time. For example, if a first timer is introduced and the integrity verification failure occurs in the above, the PDCP layer device drives or starts the first timer, and when the first timer is driving, the integrity failure may not be indicated to the upper layer device even if the integrity verification failure occurs. Alternatively, when the first timer expires, the integrity verification failure may be indicated to the upper layer device.

In another method, the PDCP layer device may indicate the integrity verification failure to the upper layer device when driving the first timer, or when starting the first timer, or before driving or starting the first timer, or the PDCP layer device may indicate the integrity verification failure to the upper layer device only when the first timer is not driving. The first timer may be stopped when the bearer (or the PDCP layer device) is released or reestablished. In the above, the first timer value may be configured for each bearer or for each downlink or uplink through the RRC message. The integrity verification failure report or indication procedure may be extended and applied to the MAC layer device. Alternatively, the PDCP state report may be triggered to report the state of data received so far when the integrity verification failure is indicated to the upper layer device.

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded.

1> If the RRC layer device receives the integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

1> If the RRC layer device receives the integrity verification failure indicator from the lower layer device (e.g., the MAC layer device or the MAC layer device of MCG), or the lower layer device (e.g., the PDCP layer device) related or connected to the DRB (e.g., the DRB connected to MCG or SCG), 2> The UE may suspend the configured DRBs or the DRBs belonging to the cell group (e.g., MCG or SCG). In another method, only the DRBs connected or mapped to the PDU session to which the DRB in which the integrity verification failure is indicated belongs may be suspended. In another method, only the DRB in which the integrity verification failure is indicated in the above may be suspended. In the above, suspending the DRB means that the data transmission or reception for the DRB is suspended in the DRB protocol layer device (e.g., the SDAP layer device, PDCP layer device, RLC layer device, or MAC layer device), or a timer is stopped if the timer is driving, or a window variable update procedure is stopped as well. Therefore, if the number of DRBs suspended in the above procedure is decreased, the UE may continue to perform data transmission or reception through some DRBs. In addition, the procedure for suspending DRBs in the above may include a procedure for suspending the PDCP layer device (PDCP suspend), a PDCP layer device reestablishment procedure, or an RLC layer device reestablishment procedure. For example, if the timer is driving, the timer is stopped and the stored data is processed (e.g., hear decompression) and transmitted to the upper layer device, or the window variables may be initialized. In another method, the DRBs may not be suspended in order to continue data transmission or reception.

2> In the above, in order to report the integrity verification failure to the base station, the UE may constitute a failure report message and transmit it to the base station. The failure report message may include an indicator or cell-related identifier indicating that integrity verification failure occurred, or a bearer identifier or logical channel identifier where the integrity verification failure occurred, or information such as a COUNT value, occurrence time, or location of data in which the integrity verification failure occurred. In the above, the failure report message or indicator may be constituted in the RRC message, MAC control information, PDCP control information, or PDCP header, and transmitted.

In another method, in the above, the UE may trigger the RRC connection reestablishment procedure. In another method, in the above, the UE may trigger the RRC connection reestablishment procedure. In addition, in the RRC connection reestablishment procedure, in the RRC connection establishment procedure, or after the connection establishment, when the UE reports a Radio Link Failure (RLF) to the base station through the RRC message, the report may include the integrity verification failure information (e.g., an indicator or cell-related identifier indicating that integrity verification failure occurred, a bearer identifier or logical channel identifier in which the integrity verification failure occurred, or information such as a COUNT value, occurrence time, or location of data in which the integrity verification failure occurred). In another method, in the above, the base station may request the RLF report or integrity verification failure report from the UE through the RRC message, and the UE may constitute the RRC message in response to the request of the base station and report the contents to the base station.

A third method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or a MAC layer device) may indicate the integrity verification procedure failure (integrity verification failure or integrity check failure) to an upper layer device (e.g., an RRC layer device).

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded.

1> If the RRC layer device receives an integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for to the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

1> If the RRC layer device receives the integrity verification failure indicator from the lower layer device (e.g., the MAC layer device or the MAC layer device of MCG) or the lower layer device (e.g., the PDCP layer device) related or connected to the DRB (e.g., DRB connected to MCG or SCG), or if in the above, the integrity verification failure occurs and the integrity verification failure occurs more than a predetermined number of times in the lower layer device, the following procedure may be performed. For example, a first variable may be newly introduced to identify whether the number of occurrence of integrity verification failures is greater than or equal to a predetermined number of times, and the value of the first variable may be increased by 1 whenever the integrity verification failure indication is received. If the variable value is greater than or equal to the predetermined number of times, the following procedure may be performed.

Also, when the following procedure is performed, the value of the first variable may be initialized to 0. In the above, the predetermined number of times may be configured for each bearer or for each uplink or downlink through the RRC message, and the predetermined number or first variable may be managed for each DRB, or the predetermined number or first variable may be managed for DRBs (all DRBs, DRBs belonging to the same PDU session, or DRBs belonging to the same cell group). In the above method, it is not necessary to continuously perform the following procedure for the continuously occurring integrity verification failure indication, so that the processing load can be reduced.

In another method, when the integrity verification failure is indicated, the following procedure may be performed only once for multiple integrity verification failures occurring within a certain period of time. For example, if a first timer is introduced and the integrity verification failure is indicated, the first timer is driven or started, and when the first timer is driving, the following procedure may not be performed even if the integrity verification failure is indicated.

Alternatively, when the first timer expires, the following procedure may be performed. In another method, the following procedure may be performed when driving or starting the first timer, or before driving or starting the first timer, or the following procedure may be performed only when the first timer is not driving. The first timer may be stopped when the bearer (or the PDCP layer device) is released or reestablished. In the above, the first timer or timer value may be configured for each bearer or for each uplink or downlink through the RRC message, and the first timer or timer value may be managed for each DRB, or the first timer or timer value may be managed for the DRBs (all DRBs, DRBs belonging to the same PDU session, or DRBs belonging to the same cell group).

2> The UE may suspend the configured DRBs or the DRBs belonging to the cell group (e.g., MCG or SCG). In another method, only the DRBs connected or mapped to the PDU session to which the DRB in which the integrity verification failure is indicated belongs may be suspended. In another method, only the DRB in which the integrity verification failure is indicated in the above may be suspended. In the above, suspending the DRB means that the data transmission or reception for the DRB is suspended in the DRB protocol layer device (e.g., the SDAP layer device, PDCP layer device, RLC layer device, or MAC layer device), or a timer is stopped if the timer is driving, or a window variable update procedure is stopped as well. Therefore, if the number of DRBs suspended in the above procedure is decreased, the UE may continue to perform data transmission or reception through some DRBs. In addition, the procedure for suspending DRBs in the above may include a procedure for suspending the PDCP layer device (PDCP suspend), a PDCP layer device reestablishment procedure, or an RLC layer device reestablishment procedure. For example, if the timer is driving, the timer is stopped and the stored data is processed (e.g., hear decompression) and transmitted to the upper layer device, or the window variables may be initialized. In another method, the DRBs may not be suspended in order to continue data transmission or reception.

2> In the above, in order to report the integrity verification failure to the base station, the UE may constitute a failure report message and transmit it to the base station. The failure report message may include an indicator or cell-related identifier indicating that integrity verification failure occurred, or a bearer identifier or logical channel identifier where the integrity verification failure occurred, or information such as a COUNT value, occurrence time, or location of data in which the integrity verification failure occurred. In the above, the failure report message or indicator may be constituted in the RRC message, MAC control information, PDCP control information, or PDCP header, and transmitted.

In another method, in the above, the UE may trigger the RRC connection reestablishment procedure. In another method, in the above, the UE may trigger the RRC connection reestablishment procedure. In addition, in the RRC connection reestablishment procedure, in the RRC connection establishment procedure, or after the connection establishment, when the UE reports a Radio Link Failure (RLF) to the base station through the RRC message, the report may include the integrity verification failure information (e.g., an indicator or cell-related identifier indicating that integrity verification failure occurred, a bearer identifier or logical channel identifier in which the integrity verification failure occurred, or information such as a COUNT value, occurrence time, or location of data in which the integrity verification failure occurred). In another method, in the above, the base station may request the RLF report or integrity verification failure report from the UE through the RRC message, and the UE may constitute the RRC message in response to the request of the base station and report the contents to the base station.

In the above, if the base station receives the integrity verification failure report indication for the DRB from the UE, the base station may transmit the RRC message indicating a handover to the UE for security or to prevent an attack, may release the bearer in which the integrity verification failure is indicated, and may configure a new bearer, and may change the QoS flow mapping mapped to the bearer in which the integrity verification failure is indicated to another bearer or a new bearer. For the bearer in which the integrity verification failure is indicated, the base station may indicate the PDCP reestablishment procedure or the RLC reestablishment procedure through the RRC message, or the base station may transmit to the UE the RRC message including the security configuration information for changing the security configuration information.

In the disclosure, the bearer may have a meaning including an SRB and a DRB, and the SRB means a signaling radio bearer and indicates a bearer that transmits or receives an RRC message. In addition, the DRB means a data radio bearer, and indicates a bearer that transmits or receives user data for each service. In addition, the UM DRB means a DRB using an RLC layer device operating in an unacknowledged mode (UM) to support low transmission delay, and the AM DRB means a DRB using an RLC layer device operating in an acknowledged mode (AM) to guarantee lossless data transmission. In addition, the SRB is characterized in that it always uses an RLC layer device operating in the AM mode to guarantee lossless data transmission. The SRB may have a meaning including SRB1, SRB2, SRB3, or SRB4.

FIG. 1 is a diagram illustrating a structure of an LTE system to which the disclosure is applicable.

With reference to FIG. 1, as illustrated, a radio access network of an LTE system includes next-generation base stations (evolved node Bs, hereinafter ENBs, Node Bs, or base stations) 1a-05, 1a-10, 1a-15, 1a-20, a mobility management layer device (MME) 1a-25, and a serving gateway (S-GW) 1a-30. A user equipment (hereinafter UF or terminal) 1a-35 accesses an external network through the ENBs 1a-05 to 1a-20 and S-GW 1a-30.

In FIG. 1, the ENBs 1a-05 to 1a-20 correspond to an existing node B of an UMTS system. The ENBs are connected to the UE 1a-35 through a radio channel, and perform a more complicated role than the existing node B. In the LTE system, since all user traffic pertaining to real-time service, such as voice over IP (VoIP), via the Internet protocol, is serviced through a shared channel, a device that performs scheduling by collecting state information, such as buffer states, available transmit power states, and channel states of UEs, is required, and the ENBs 1a-05 to 1a-20 are in charge of this function of the device. In general, one ENB controls multiple cells. For example, in order to implement a transmission rate of 100 Mbps, the LTE system uses orthogonal frequency division multiplexing (OFDM) as a radio access technology in the bandwidth of 20 MHz.

In addition, the LTE system adopts an adaptive modulation & coding (hereinafter referred to as AMC) scheme for determining a modulation scheme and a channel coding rate based on the channel state of the UE. The S-GW 1a-30 is a device for providing a data bearer and generating or removing a data bearer under the control of the MME 1a-25. The MME is a device in charge of various control functions in addition to a mobility management function for the UE, and is connected to multiple base stations.

Figure 2:
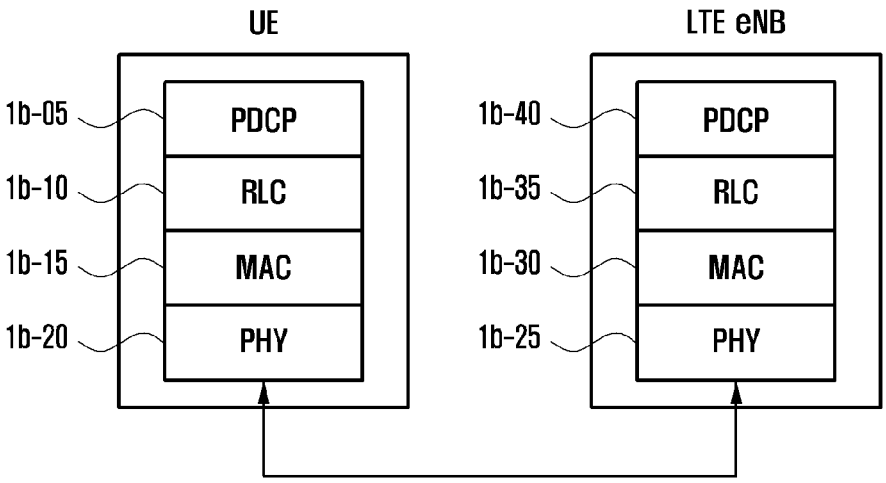
FIG. 2 is a diagram illustrating a radio protocol structure in an LTE system to which the disclosure is applicable.

FIG. 2 is a diagram illustrating a radio protocol structure in an LTE system to which the disclosure is applicable.

With reference to FIG. 2, the radio protocol of the LTE system includes packet data convergence protocols (PDCPs) 1b-05, 1b-40, radio link controls (RLCs) 1b-10, 1b-35, and medium access controls (MACs) 1b-15, 1b-30, in a UE and an ENB, respectively. The packet data convergence protocols (PDCPs) 1b-05, 1b-40 are used to perform operations, such as IP header compression/restoration. The main functions of PDCPs are summarized as follows.

Header compression and decompression functions (Header compression and decompression: ROHC only)
    Transfer function of user data
    In-sequence delivery function (In-sequence delivery of upper layer PDUs at PDCP re-establishment procedure for RLC AM)
    Sequence reordering function (For split bearers in DC (only support for RLC AM): PDCP PDU routing for transmission and PDCP PDU reordering for reception)
    Duplicate detection function (Duplicate detection of lower layer SDUs at PDCP re-establishment procedure for RLC AM)
    Retransmission function (Retransmission of PDCP SDUs at handover and, for split bearers in DC, of PDCP PDUs at PDCP data-recovery procedure, for RLC AM)
    Ciphering and deciphering functions
    Timer-based SDU discard function (Timer-based SDU discard in uplink.)
    The radio link control (hereinafter referred to as RLC) 1b-10, 1b-35 performs ARQ operation by reconstituting a PDCP packet data unit (PDU) to an appropriate size. The main functions of RLC are summarized below.
    Data transfer function (Transfer of upper layer PDUs)
    ARQ function (Error Correction through ARQ (only for AM data transfer))
    Concatenation, segmentation, and reassembly functions (Concatenation, segmentation and reassembly of RLC SDUs (only for UM and AM data transfer))
    Re-segmentation function (Re-segmentation of RLC data PDUs (only for AM data transfer))
    Sequence reordering function (Reordering of RLC data PDUs (only for UM and AM data transfer)
    Duplicate detection function (Duplicate detection (only for UM and AM data transfer))
    Error detection function (Protocol error detection (only for AM data transfer))
    RLC SDU discard function (RLC SDU discard (only for UM and AM data transfer))
    RLC re-establishment function
    The MACs 1b-15, 1b-30 are connected to multiple RLC layer devices constituted in one UE, and may perform an operation of multiplexing RLC PDUs to MAC PDUs and demultiplexing RLC PDUs from MAC PDUs. The main functions of MACs are summarized as follows.

Mapping function (Mapping between logical channels and transport channels)

Multiplexing and demultiplexing functions (Multiplexing/demultiplexing of MAC SDUs belonging to one or different logical channels into/from transport blocks (TB) delivered to/from the physical layer on transport channels)

Scheduling information reporting function

HARQ function (Error correction through HARQ)

Priority handling function between logical channels (Priority handling between logical channels of one UE)

Priority handling function between UEs (Priority handling between UEs by means of dynamic scheduling)

MBMS service identification function

Transport format selection function

Padding function

Physical layers 1b-20, 1b-25 may perform operations of channel coding and modulating upper layer data, forming the upper layer data into an OFDM symbol, transmitting the OFDM symbol through a radio channel, or of demodulating an OFDM symbol received through a radio channel, channel-decoding the OFDM symbol, and transmitting the OFDM symbol to an upper layer.

Figure 3:
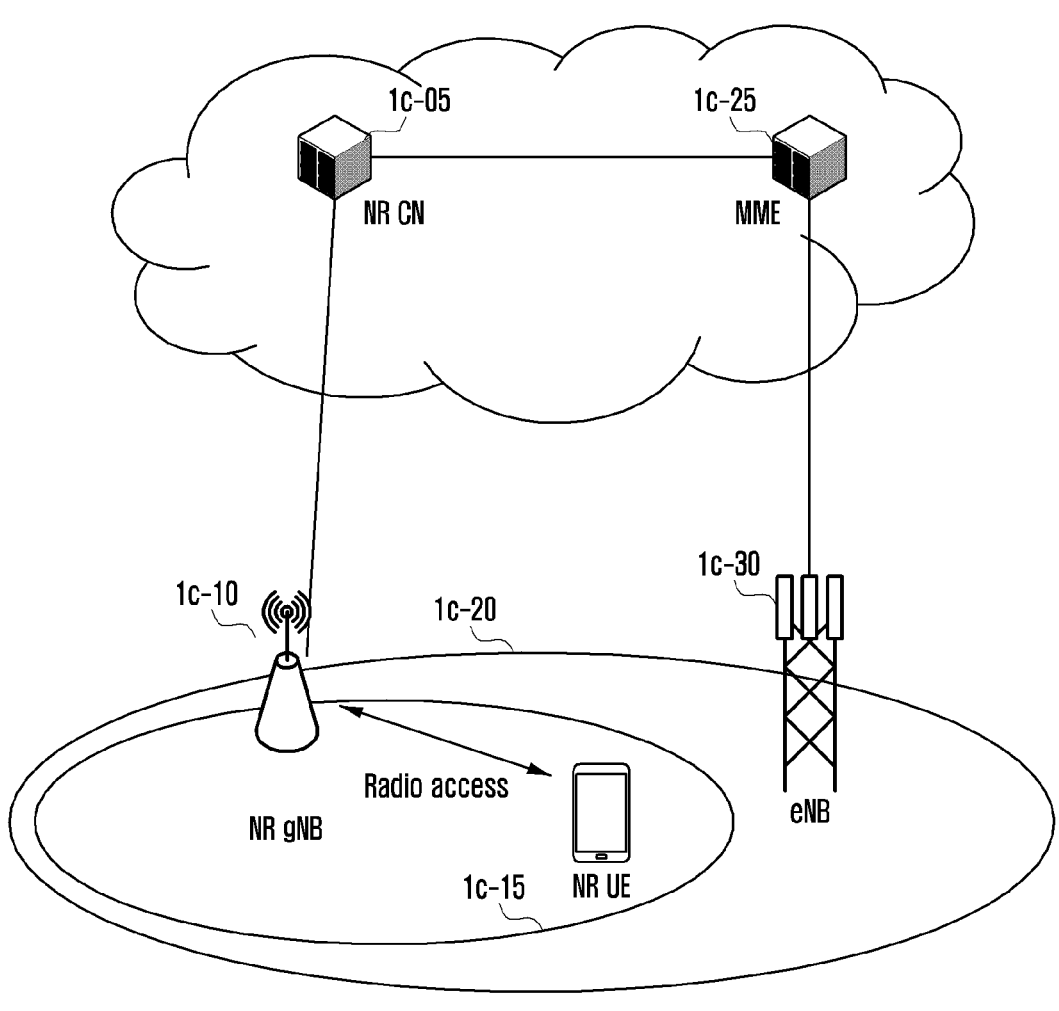
FIG. 3 is a diagram illustrating a structure of a next-generation mobile communication system to which the disclosure is applicable.

FIG. 3 is a diagram illustrating a structure of a next-generation mobile communication system to which the disclosure is applicable.

With reference to FIG. 3, a radio access network of a next-generation mobile communication system (hereinafter referred to as NR or 5G) includes a next-generation base station (new radio node B, hereinafter referred to as an NR gNB, or NR base station) 1c-10 and a new radio core network (NR CN) 1c-05. A user terminal (a new radio user equipment, hereinafter referred to as NR UE or a UE) 1c-15 accesses an external network via an NR gNB 1c-10 and an NR CN 1c-05.

In FIG. 3, the NR gNB 1c-10 corresponds to an evolved node B (eNB) of an existing LTE system. The NR gNB is connected to the NR UE 1c-15 via a radio channel, and may provide an excellent service as compared to the existing node B. In the next-generation mobile communication system, since all types of user traffics are serviced through a shared channel, there is a need for a device for performing scheduling by collecting state information, such as buffer states, available transmission power states, and channel states of UEs, and the NR NB 1c-10 is in charge of this function. In general, one NR gNB controls multiple cells. In order to implement ultra-high speed data transmission as compared to the existing LTE, the NR gNB may have the existing maximum bandwidth or more, and may additionally employ beamforming technology using orthogonal frequency division multiplexing (hereinafter referred to as OFDM) as a radio access technology. In addition, the NR gNB adopts an adaptive modulation & coding (AMC) scheme that determines a modulation scheme and a channel coding rate based on the channel state of a UE.

The NR CN 1c-05 performs functions, such as mobility support, bearer configuration, QoS configuration, and the like. The NR CN is a device that is in charge of various control functions in addition to a mobility management function for a UE, and is connected to multiple base stations. In addition, the next-generation mobile communication system may also operate in conjunction with the existing LTE system, and the NR CN may be connected to an MME 1c-25 via a network interface. The MME is connected to an eNB 1c-30, that is, to the existing base station.

Figure 4:
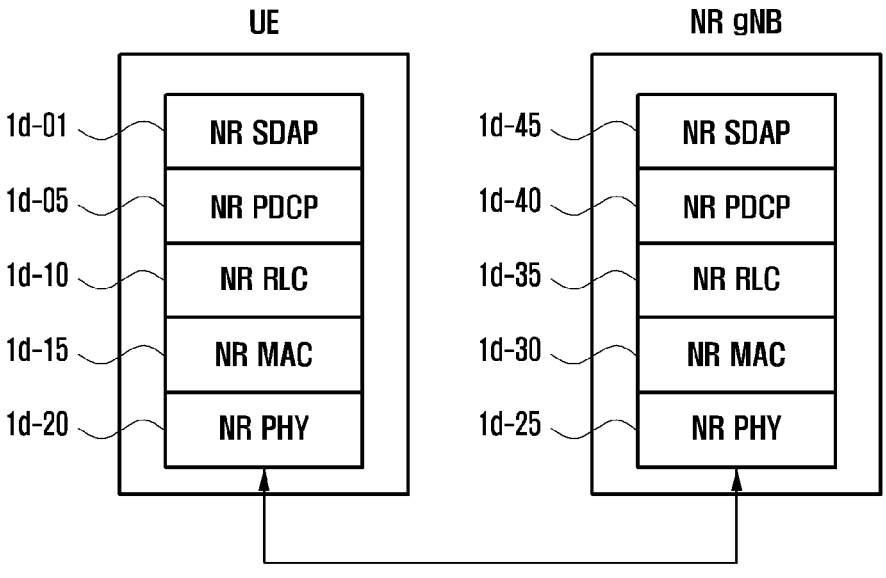
FIG. 4 is a diagram illustrating a radio protocol structure of a next-generation mobile communication system to which the disclosure is applicable.

FIG. 4 is a diagram illustrating a radio protocol structure of a next-generation mobile communication system to which the disclosure is applicable.

With reference to FIG. 4, the radio protocol of the next-generation mobile communication system includes NR SDAPs 1d-01, 1d-45, NR PDCPs 1d-05, 1d-40, NR RLCs 1d-10, 1d-35, and NR MACs 1d-15, 1d-30, respectively, in a UE and an NR base station, respectively.

The main functions of the NR SDAPs 1d-01, 1d-45 may include some of the following functions.

Transfer function of user data (transfer of user plane data)

Mapping function between a QoS flow and a DRB for both DL and UL

Marking function of QoS flow ID in both UL and DL (marking QoS flow ID in both DL and UL packets)

Mapping function of reflective QoS flow to a databear for UL SDAP PDUs (reflective QoS flow to DRB mapping for the UL SDAP PDUs).

For the SDAP layer device, the UE may be configured as to whether or not use the header of the SDAP layer device or the function of the SDAP layer device for each PDCP layer device, for each bearer, and for each logical channel through an RRC message. In the case that the SDAP header is configured, an NAS QoS reflective configuration 1-bit indicator (NAS reflective QoS) and an AS QoS reflective configuration 1-bit indicator (AS reflective QoS) of the SDAP header are used to instruct the JE to enable updating or reconfiguration of the mapping information relating to the QoS flow of uplink and downlink and data bearer. The SDAP header may include QoS flow ID information indicating QoS. The QoS information may be used as data processing priority, scheduling information, etc., in order to support a smooth service.

The main functions of the NR PDCPs 1d-05, 1d-40 may include some of the following functions Header compression and decompression functions (Header compression and decompression: ROHC only)

Transfer function of user data

In-sequence delivery function (In-sequence delivery of upper layer PDUs)

Out-of-sequence delivery function (Out-of-sequence delivery of upper layer PDUs)

Sequence reordering function (PDCP PDU reordering for reception)

Duplicate detection function (Duplicate detection of lower layer SDUs)

Retransmission function (Retransmission of PDCP SDUs)

Ciphering and deciphering functions

Timer-based SDU discard function (Timer-based SDU discard in uplink.)

The reordering function of the NR PDCP device refers to a function of sequentially reordering PDCP PDUs, received from a lower layer, based on a PDCP sequence number (SN), and may include a function of transmitting data to an upper layer in the reordered sequence, a function of directly transmitting data to an upper layer without taking the sequence into consideration, a function of reordering the sequence and recording missing PDCP PDUs, a function of providing a state report on the missing PDCP PDUs to a transmission side, and a function of requesting retransmission of the missing PDCP PDUs.

The main functions of the NR RLCs 1d-10, 1d-35 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error Correction through ARQ)

Concatenation, segmentation, and reassembly functions (Concatenation, segmentation and reassembly of RLC SDUs)

Re-segmentation function (Re-segmentation of RLC data PDUs)

Sequence reordering function (Reordering of RLC data PDUs)

Duplicate detection function

Error detection function (Protocol error detection)

RLC SDU discard function

RLC re-establishment function

The in-sequence delivery function of the NR RLC device refers to a function of transmitting RLC SDUs, received from a lower layer, to an upper layer in a sequence of reception, and may include, in the case that one RLC SDU is originally segmented into multiple RLC SDUs and received, a function of reassembling and transmitting the multiple RLC SDUs, a function of reordering the received RLC PDUs based on an RLC sequence number (SN) or PDCP SN, a function of reordering the sequence and recording missing RLC PDUs, a function of providing a state report on the missing RLC PDUs to a transmission side, a function of requesting retransmission of the missing RLC PDUs, a function of sequentially transmitting only RLC SDUs prior to the missing RLC SDU to an upper layer in the case that an RLC SDU is missing, or a function of sequentially transmitting all the RLC SDUs received before a timer starts to an upper layer if the timer expires even if there is a missing RLC SDU, or a function of sequentially transmitting all RLC SDUs received so far to an upper layer if a predetermined timer expires even if there is a missing RLC SDU.

In addition, the RLC PDUs may be processed in the sequence in which the RLC PDUs are received (in a sequence of arrival regardless of the serial number or sequence number), and may be transmitted to a PDCP device in out-of-sequence delivery. In the case of segment, the segments stored in a buffer or segments to be received later may be received, reconfigured in one complete RLC PDU, and then processed, and transmitted to the PDCP device. The NR RLC layer may not include a concatenation function, and the concatenation function may be performed by the NR MAC layer, or may be replaced by a multiplexing function of the NR MAC layer.

The out-of-sequence delivery function of the NR RLC device refers to a function of directly transmitting the RLC SDUs, received from the lower layer, to an upper layer regardless of the order thereof, and may include, in the case that one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1d-15, 1d-30 may be connected to multiple NR RLC layer devices constituted in one UE, and the main function of the NR MAC may include some of the following functions.

Mapping function (Mapping between logical channels and transport channels)

Multiplexing and demultiplexing functions (Multiplexing/demultiplexing of MAC SDUs)

Scheduling information reporting function

HARQ function (Error correction through HARQ)

Priority handling function between logical channels (Priority handling between logical channels of one UE)

Priority handling function between UEs (Priority handling between UEs by means of dynamic scheduling)

MBMS service identification function

Transport format selection function

Padding function

The NR PHY layers 1d-20, 1d-25 may perform operations of channel-coding and modulating upper layer data, forming the upper layer data into an OFDM symbol, transmitting the OFDM symbols via a radio channel or demodulating and channel decoding of the OFDM symbols received via the radio channel, and transferring the OFDM symbol to an upper layer.

Figure 5:
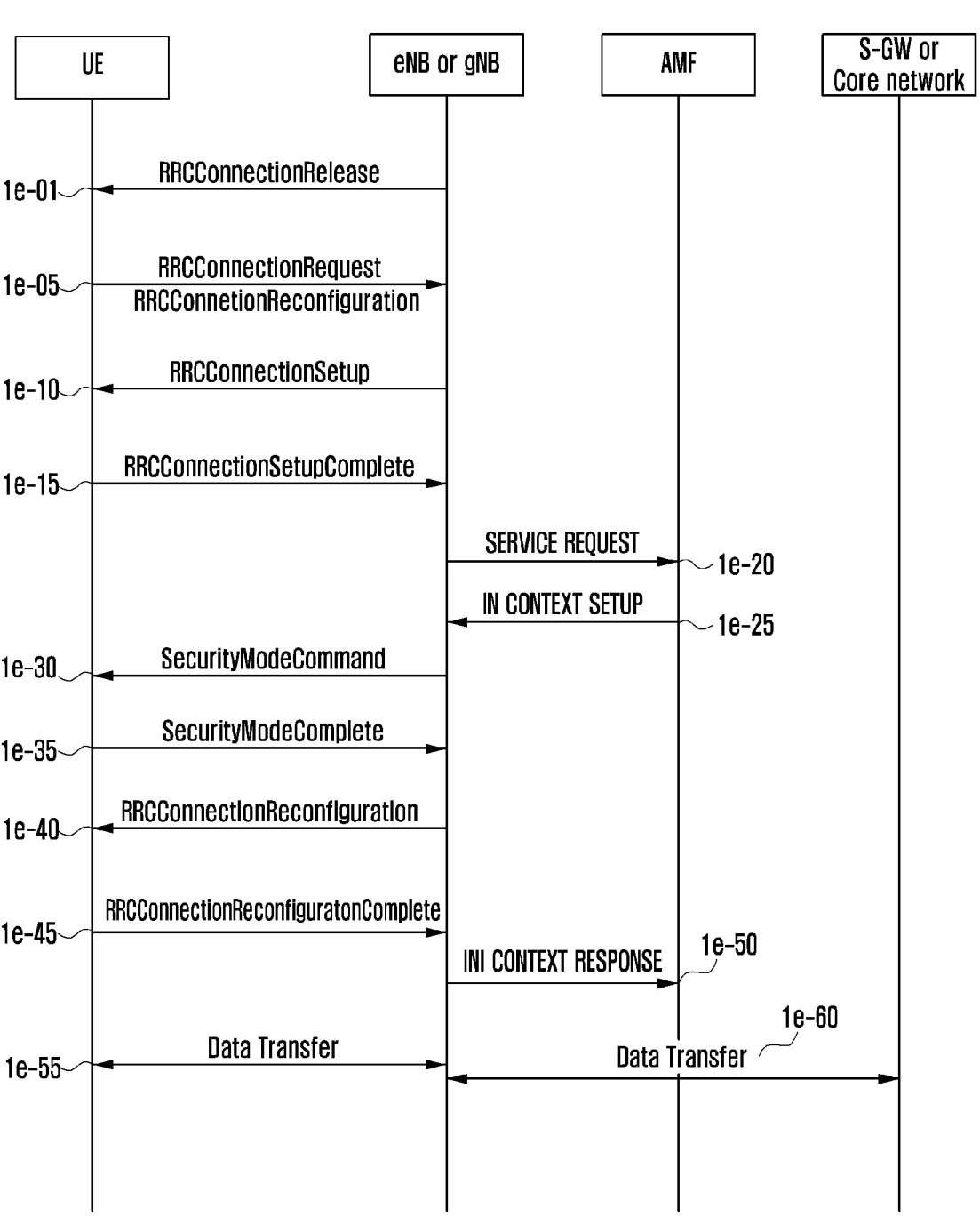
FIG. 5 is a diagram illustrating a procedure for establishing an RRC connection with a base station when a terminal establishes a connection with a network in a next-generation mobile communication system according to some embodiments of the disclosure.

FIG. 5 is a diagram illustrating a procedure for establishing an RRC connection with a base station when a terminal establishes a connection with the network in a next-generation mobile communication system according to some embodiments of the disclosure.

With reference to FIG. 5, if a terminal (UE) having transmitted and received data in RRC connected mode does not transmit or receive data for a specific reason or for a preset time, a base station may transmit an RRCConnectionRelease message to the UE to allow the UE to transition to RRC idle mode (1e-01). Later, when data to be transmitted is generated, the UE without a currently established connection (hereinafter, idle mode UE) may perform an RRC connection establishment process with the base station.

The UE may establish reverse transmission synchronization with the base station through a random access process and transmit an RRCConnectionRequest message to the base station (1e-05). The RRCConnectionRequest message may include an identifier of the UE, a reason for connection establishment (establishmentCause), and the like.

The base station may transmit an RRCConnectionSetup message to the UE to allow the UE to establish an RRC connection (1e-10). The RRCConnectionSetup message may include at least one of configuration information for each logical channel, configuration information for each bearer, configuration information for a PDCP layer device, configuration information for an RLC layer device, configuration information for a MAC layer device, and the like.

Through the RRCConnectionSetup message, a bearer identifier (e.g., SRB identifier or DRB identifier) may be assigned to each bearer, and configurations of the PDCP layer device, RLC layer device, MAC layer device, and PHY layer device may be indicated for each bearer. In addition, through the RRCConnectionSetup message, it is possible to configure the length (e.g., 12 bits or 18 bits) of the PDCP sequence number used in the PDCP layer device for each bearer, and to configure the length (e.g., 6 bits, 12 bits, or 18 bits) of the RLC sequence number used in the RLC layer device for each bearer. Further, through the RRCConnectionSetup message, it is possible to indicate, for each bearer, whether to use the header compression and decompression protocol in the uplink or downlink for the PDCP layer device, and to indicate whether to perform an integrity protection or verification procedure. Further, the RRCConnectionSetup message may indicate whether to perform out-of-order delivery function in the PDCP layer device. Further, the RRCConnectionSetup message may be configured with the number of integrity verification failures or a first tinier value that triggers a procedure for reporting the integrity verification failure to a network or an RRC connection reestablishment procedure the UE or each PDU session (or for each SDAP layer device configuration information), or each bearer when the integrity verification failure occurs in the PDCP layer device, or may include an indicator indicating whether to trigger the procedure for reporting the integrity verification failure to the network or the RRC connection reestablishment procedure when the integrity verification procedure failure occurs.

If the number of integrity verification failures is configured through the RRC message, when the received data fails the integrity verification procedure more than or equal to the number of integrity verification failures configured above, the receiving PDCP layer device may report the integrity verification failure to an upper layer device (e.g., RRC layer device), and the upper layer device (e.g., RRC layer device) may trigger the RRC connection reestablishment procedure or the procedure for reporting the integrity verification failure to the network (as another method, the PDCP layer device may report the integrity verification failure through an indicator of the PDCP header or PDCP control data (e.g., PDCP status report or new PDCP control data)).

Hence, it is possible to reduce the UE processing load in which the receiving PDCP layer device reports an integrity verification failure to an upper layer device (e.g., RRC layer device) whenever an integrity verification failure occurs. In another method, if the number of integrity verification failures is configured through the RRC message, the receiving PDCP layer device may report to the RRC layer device whenever received data fails the integrity verification procedure, and the RRC layer device may trigger an RRC connection reestablishment procedure or a procedure for reporting to the network when the number of integrity verification failures reported from the lower PDCP layer device is greater than or equal to the number of integrity verification failures configured above.

Hence, since the receiving PDCP layer device only reports an integrity verification failure to an upper layer device (e.g., RRC layer device), the load of managing the number of integrity verification failures can be reduced. In another method, an additional integrity verification failure may not be reported while the timer is driving by using a timer.

The UE having established an RRC connection may transmit an RRCConnectionSetupComplete message to the base station (1e-15). The RRCConnetionSetupComplete message may include a control message called SERVICE REQUEST by which the UE requests the AMF or the MME to configure a bearer for a specific service. The base station may transmit the SERVICE REQUEST message contained in the RRCConnetionSetupComplete message to the AMF or the MME (1e-20). The AMF or the MME may determine whether to provide the service requested by the UE.

Upon determining to provide the service requested by the UE, the AMF or the MME may transmit an INITIAL CONTEXT SETUP REQUEST message to the base station (1e-25). The INITIAL CONTEXT SETUP REQUEST message may include quality of service (QoS) information to be applied when configuring information such as a data radio bearer (DRB), and security-related information to be applied to the DRB (e.g., Security Key, Security Algorithm).

The base station and the UE may exchange a Security-ModeCommand message (1e-30) and a SecurityModeComplete message (1e-35) to configure security. When the security configuration is completed, the base station may transmit an RRCConnectionReconfiguration message to the JE (1e-40).

Through the RRCConnectionReconfiguration message, a bearer identifier (e.g., SRB identifier or DRB identifier) may be assigned to each bearer, and configurations of the PDCP layer device, RLC layer device, MAC layer device, and PHY layer device may be indicated for each bearer. Also, through the RRCConnectionReconfiguration message, it is possible to configure the length (e.g., 12 bits or 18 bits) of the PDCP sequence number used in the PDCP layer device for each bearer, and to configure the length (e.g., 6 bits, 12 bits, or 18 bits) of the RLC sequence number used in the RLC layer device for each bearer. Further, through the RRCConnectionSetup message, it is possible to indicate, for each bearer, whether to use the header compression and decompression protocol in the uplink or downlink for the PDCP layer device, and to indicate whether to perform an integrity protection or verification procedure. Further, it is possible to indicate whether to perform out-of-order delivery function in the PDCP layer device.

In addition, the RRCConnectionReconfiguration message may include configuration information of a DRB through which user data is to be processed, and the UE may configure a DRB by applying the above information and transmit an RRCConnectionReconfigurationComplete message to the base station (1e-45). The base station having completed DRB configuration with the UE may transmit an INITIAL CONTEXT SETUP COMPLETE message to the AMF or MME and complete the connection (1e-50).

When all the above processes are completed, the UE can transmit and receive data through the base station and the core network (1e-55, 1e-60). According to some embodiments, the data transmission process is largely composed of three steps RRC connection establishment, security configuration, and DRB configuration. In addition, the base station may transmit an RRC Connection Reconfiguration message to newly configure, add, or change configurations to the UE for a specific reason (1e-65).

Through the RRCConnectionReconfiguration message, a bearer identifier (e.g., SRB identifier or DRB identifier) may be assigned to each bearer, and configurations of the PDCP layer device, RLC layer device, MAC layer device, and PHY layer device may be indicated for each bearer. Also, through the RRCConnectionReconfiguration message, it is possible to configure the length (e.g., 12 bits or 18 bits) of the PDCP sequence number used in the PDCP layer device for each bearer, and to configure the length (e.g., 6 bits, 12 bits, or 18 bits) of the RLC sequence number used in the RLC layer device for each bearer. Further, through the RRCConnectionSetup message, it is possible to indicate, for each bearer, whether to use the header compression and decompression protocol in the uplink or downlink for the PDCP layer device, and to indicate whether to perform an integrity protection or verification procedure. Further, the RRCConnectionSetup message may indicate whether to perform out-of-order delivery function in the PDCP layer device. Further, the RRCReconfiguration (RRCConnection-Reconfiguration) message may be configured with the number of integrity verification failures or a first timer value that triggers the procedure for reporting the integrity verification failure to the network or the RRC connection reestablishment procedure for the UE, or each PDU session (or each SDAP layer device configuration information), or each bearer when the integrity verification failure occurs in the PDCP layer device, or may include an indicator indicating whether to trigger the procedure for reporting the integrity verification failure to the network or the RRC connection reestablishment procedure when the integrity verification procedure failure occurs. If the number of integrity verification failures is configured through the RRC message, when the received data fails the integrity verification procedure more than or equal to the number of integrity verification failures configured above, the receiving PDCP layer device may report the integrity verification failure to an upper layer device (e.g., RRC layer device), and the upper layer device (e.g., RRC layer device) may trigger the RRC connection reestablishment procedure or the procedure for reporting the integrity verification failure to the network (as another method, the PDCP layer device may report the integrity verification failure through an indicator of the PDCP header or PDCP control data (e.g., PDCP state report or new PDCP control data)).

Hence, it is possible to reduce the UE processing load in which the receiving PDCP layer device reports an integrity verification failure to an upper layer device (e.g., RRC layer device) whenever an integrity verification failure occurs. As another method, if the number of integrity verification failures is configured through the RRC message, the receiving PDCP layer device may report to the RRC layer device whenever received data fails the integrity verification procedure, and the RRC layer device may trigger an RRC connection reestablishment procedure or a procedure for reporting to the network when the number of integrity verification failures reported from the lower PDCP layer device is greater than or equal to the number of integrity verification failures configured above.

Hence, since the receiving PDCP layer device only reports an integrity verification failure to an upper layer device (e.g., RRC layer device), the load of managing the number of integrity verification failures can be reduced. In another method, an additional integrity verification failure may not be reported while the timer is driving by using a timer.

The procedure for establishing a connection between the UE and the base station proposed in the disclosure may be applied to connection establishment between a UE and an LTE base station, and may also be applied to connection establishment between a UE and a NR base station.

In addition, in the above, the base station may transmit the RRC message (UEcapabliityRequest) requesting the UE capability to the UE in order to identify the UE capability, and the UE may constitute the UE capability in response to the request of the base station and report the UE capability to the base station through the RRC message (UEcapabilityReport). In the above, when the UE performs a UE capability report (UE capability report) procedure, the RRC message (e.g., non access stratum (NAS) message or access stratum (AS) message) reporting the UE capability may include some or a plurality of pieces of information among the following information.

Whether the integrity protection procedure (or function) is supported for each bearer Whether the integrity protection procedure is supported for DRB If the integrity protection procedure is supported for DRB, whether the integrity protection procedure is supported at any data rate regardless of the maximum data rate (e.g., 64 kbps or full rate) or data rate supported when the integrity protection procedure is applied Information on the functions supported by the UE Release information supported by the UE, for example, Rel-15, Rel-16, or Rel-17. For example, if the UE supports Rel-15 only, the base station or network may consider that the integrity protection procedure for DRB is supportable only at the data rate of 64 kbps. Alternatively, the integrity protection procedure function for the DRB may be identified through the UE capability report message (e.g., non-access stratum (NAS) message or access stratum (AS) message). As another method, the base station or network may consider that, if the UE supports Rel-15 or Rel-16, the integrity protection procedure for DRB is always supportable regardless of data rate, or the integrity protection procedure function for the DRB may be identified through the UE capability report message (e.g., non-access stratum (NAS) message or access stratum (AS) message).

Whether the DRB supports the integrity verification failure report procedure when the integrity verification failure occurs.

In addition, in the above of the disclosure, the base station may constitute the RRCSetup message, RRCResume message, or RRCReconfiguration message by applying the following configuration methods and apply the constituted RRC messages to the UE to configure bearer configuration information or protocol layer device configuration information.

For example, the ciphering procedure, integrity protection procedure, or integrity verification procedure is a procedure that has high data processing complexity or requires a lot of data processing time. Therefore, in the disclosure, the following configuration methods can be applied to the RRC-Setup message, RRCResume message, or RRCReconfiguration message in order to reduce the integrity protection function or integrity verification function performed on transmitted data or received data.

First configuration method: In the first configuration method, when the base station configures the integrity protection function, integrity verification function, ciphering function, or deciphering function for the UE through the RRC message, the base station may configure through an indicator (IntegrityProtection) for each bearer, so the integrity protection function, integrity verification function, ciphering function, or deciphering function may be performed only for a service (or bearer) that requires the integrity protection function, integrity verification function, ciphering function, or deciphering function, among a plurality of bearers (SRBs or DRBs). Accordingly, it is possible to prevent unnecessary data processing complexity or processing speed delay by not configuring the indicator for a service or bearer that does not require the integrity protection function, integrity verification function, ciphering function, or deciphering function as described above. In order to minimize the complexity of implementation above, the base station may configure as to whether or not to use or apply the integrity protection function, integrity verification function, ciphering function, or deciphering function through the RRC message when establishing a bearer, and after the bearer is established, the base station may release, reconfigure (change whether or not to use or apply), or may not allow configure (configure whether or not to use or apply) the integrity protection function, integrity verification function, ciphering function, or deciphering function.

In another method, in the case that the integrity protection function, integrity verification function, ciphering function, or deciphering function is no longer required in the above, the base station may reconfigure the integrity protection function, integrity verification function, ciphering function, or deciphering function through the RRC message in order to reduce the complexity of data processing, so that the integrity protection function, integrity verification function, ciphering function, or deciphering function may be released or stopped. In the case that the integrity protection function, integrity verification function, ciphering function, or deciphering function is required again in the above, the base station may reconfigure the integrity protection function, integrity verification function, ciphering function, or deciphering function through the RRC message, so that the integrity protection function, integrity verification function, ciphering function, or deciphering function may be configured or resumed.

In the above, the indication for stopping (or deactivating) or resuming (or activating) the integrity protection function, integrity verification function, ciphering function, or deciphering function for each bearer may be indicated through the RRC message, MAC control information, RLC control information (RLC control PDU), or PDCP control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure QoS flow identifiers mapped to the bearer, or may configure whether or not to use a SDAP header for an uplink or downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

Second configuration method: In the second configuration method, when the base station configures the integrity protection function, integrity verification function, ciphering function, or deciphering function for the UE through the RRC message, the base station may configure whether or not to perform the integrity protection function, integrity verification function, ciphering function, or deciphering function for each bearer or for an uplink or downlink of each bearer through an indicator (integrityProtectionUL, integrityprotectionDL, cipheringDL, or cipheringUL), so the integrity protection function, integrity verification function, ciphering function, or deciphering function may be performed only for a certain bearer or for the downlink of each bearer, or the integrity protection function, integrity verification function, ciphering function, or deciphering function may be performed only for a certain bearer or for the uplink of each bearer. Therefore, for the uplink or downlink that does not require the integrity protection function, integrity verification function, ciphering function, or deciphering function as described above, the base station may prevent unnecessary data processing complexity or processing speed delay by not configuring the indicator for each bearer.

In order to minimize the complexity of implementation in the above, the base station may configure as to whether or not to use or apply the integrity protection function, integrity verification function, ciphering function, or deciphering through the RRC message when establishing a bearer, and after the bearer is established, the base station may release, reconfigure (change whether or not to use or apply) or may not allow to configure (configure whether or not to use or apply) the integrity protection function, integrity verification function, ciphering function, or deciphering function. In another method, in the case that the integrity protection function, integrity verification function, ciphering function, or deciphering function is no longer required in the above, the base station may reconfigure the integrity protection function, integrity verification function, ciphering function, or deciphering function through the RRC message in order to reduce the complexity of data processing, so that the integrity protection function, integrity verification function, ciphering function, or deciphering function may be released or stopped. In the case that the integrity protection function, integrity verification function, ciphering function, or deciphering function is required again in the above, the base station may reconfigure the integrity protection function, integrity verification function, ciphering function, or deciphering function through the RRC message, so that the integrity protection function, integrity verification function, ciphering function, or deciphering function may be configured (or activated) or resumed.

In the above, the indication for stopping (or deactivating) or resuming (or activating) the integrity protection function, integrity verification function, ciphering function, or deciphering function for each bearer may be indicated through the RRC message, MAC control information, RLC control information (RLC control PDU), or PDCP control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or an indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure QoS flow identifiers mapped to the bearer, or may configure whether or not to use a SDAP header for an uplink or downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

Third configuration method: In the third configuration method, when the base station configures the integrity protection function, integrity verification function, ciphering function, or deciphering for the UE through the RRC message, the base station may configure whether or not to perform the integrity protection function, integrity verification function, ciphering function, or deciphering for each bearer, or for an uplink or downlink of each bearer, respectively, as an indicator (integrityProtectionUL or integrityprotectionDL or cipheringDL or cipheringUL). Thus, the base station may perform the integrity protection function, integrity verification function, ciphering function, or deciphering function only for a certain bearer or only for the downlink of each bearer, or the base station may perform the integrity protection function, integrity verification function, ciphering function, or deciphering function only for a certain bearer or only for the uplink of each bearer. In the third configuration method, for the uplink or downlink that does not require the integrity protection function, integrity verification function, ciphering function, or deciphering function, the base station may not apply the integrity protection function, integrity verification function, ciphering function, or deciphering function in order to prevent unnecessary data processing complexity or processing speed delay. For example, for each data, the integrity protection procedure or ciphering procedure may be applied to some data, or the integrity protection procedure or ciphering procedure may not be applied to some data.

In another method, when the integrity protection function, integrity verification function, ciphering function, or deciphering function is configured through the RRC message, the indicator may be configured to apply or not to apply the integrity protection function or ciphering function for each data of an upper layer device or each QoS flow. For example, the RRC message may indicate the integrity protection function, integrity verification function, ciphering function, or deciphering function to be dynamically applied to each data as an indicator. For example, in the case that the above indicator is configured, a transmitting PDCP layer device may be implemented to apply the integrity protection procedure or ciphering procedure to some data or not to apply the integrity protection procedure or ciphering procedure to some data with respect to an upper layer device data.

In another method, through the RRC message, a protocol data unit (PDU) session, QoS flow information, or QoS flow identifier information, to which the integrity protection function, integrity verification function, ciphering function, or deciphering function may be applied, may be configured, or a PDU session, QoS flow information, or QoS flow identifier information, to which the integrity protection function, integrity verification function, ciphering function, or deciphering function may not be applied, may be configured. Therefore, the transmitting PDCP layer device may apply the integrity protection procedure or ciphering procedure to some data (e.g., data that belongs to the PDU session or QoS flow configured to be applied with the integrity protection function or ciphering function in the above, or includes the QoS flow identifier configured to be applied with the integrity protection function or ciphering function in the above) based on the configuration information. Alternatively, the transmitting PDCP layer device may not apply the integrity protection procedure or ciphering procedure for some data (e.g., data that does not belong to the PDU session or QoS flow configured to be applied with the integrity protection function or ciphering in the above, or does not include the QoS flow identifier configured to be applied with the integrity protection function or ciphering function in the above, or belongs to the PDU session or QoS flow configured not to be applied with the integrity protection function or ciphering function in the above, or includes the QoS identifier configured not to be applied with the integrity protection function or ciphering function in the above).

In addition, a 1-bit indicator of the PDCP header (e.g., 1-bit indicator for ciphering function or 1-bit indicator for integrity protection function) can be introduced and used so that a receiving terminal (e.g., a receiving PDCP layer device) can distinguish the data to which the integrity protection or ciphering is applied from the data to which the integrity protection or ciphering is not applied). In another method, a special value of a MAC-I field (e.g., a value of all 0 or a value of all 1) may be defined to distinguish the data to which the integrity protection function is applied from the data to which the integrity protection function is not applied.

In another method, in the case of not requiring the integrity protection function, integrity verification function, ciphering function, or deciphering function, the integrity protection function, integrity verification function, ciphering function, or deciphering function may be reconfigured through the RRC message in order to decrease data processing complexity, so that the integrity protection function, integrity verification function, ciphering function, or deciphering function may be released or stopped. In the case of requiring the integrity protection function, integrity verification function, ciphering function, or deciphering function again, the integrity protection function, integrity verification function, ciphering function, or deciphering function may be reconfigured through the RRC message, so that the integrity protection function or integrity verification function may be configured (or activated), or resumed.

In the above, the indication for stopping (or deactivating) or resuming (or activating) the integrity protection function, integrity verification function, ciphering function, or deciphering function for each bearer may be indicated through the RRC message, MAC control information, RLC control information (RLC control PDU), or PDCP control information (PDCP control PDU). In the above, the RRC message, MAC control information, RLC control information (RLC control PDU), or PDCP control information (PDCP control PDU) for indicating the configuration, reconfiguration, stop, or resume of the integrity protection function, integrity verification function, ciphering function, or deciphering function may include a bearer identifier, a logical channel identifier, or an indicator (stop, resume, activation, or deactivation). For example, the indicator for the ciphering or deciphering function and the indicator for the integrity protection or integrity verification function may be defined and used, respectively.

When the RRC message includes the configuration information for each bearer, the SDAP layer device configuration information for each bearer may indicate which PDU session the bearer belongs to with a PDU session identifier, may configure the QoS flow identifiers mapped to the bearer, or may configure whether or not to use a SDAP header for an uplink or downlink in the bearer with an indicator. In addition, in the case that the integrity verification failure occurs for the bearer (e.g., DRB) through the RRC message, whether or not to perform a failure report to the base station for the integrity verification failure may be configured as an indicator. In another method, the indicator may be broadcast through system information to indicate terminals accessing a cell.

The integrity protection or verification function may be configured for each bearer configured in the UE according to the first configuration method, the second configuration method, or the third configuration method proposed in the disclosure.

In the following of the disclosure, in order to reduce the processing load of the UE due to the ciphering function or integrity protection function, a procedure for configuring, activating, resuming, not configuring, releasing, deactivating, or stopping the ciphering function, deciphering function, integrity protection function, or integrity verification function through the RRC message, MAC control information, RLC control information (RLC control PDU), or PDCP control information (PDCP control PDU) is proposed. That is, the indicator or configuration information of the RRC message, MAC control information, RLC control information (RLC control PDU), or PDCP control information (PDCP control PDU) may indicate to configure, activate, resume, not configure, release, deactivate, or stop the ciphering function, deciphering function, the integrity protection function, or the integrity verification function. In the above, in the case of the indication through the RRC message, the above indication may be transmitted or indicated to the lower layer device (e.g., the PDCP layer device or the MAC layer device).

In accordance with the above indication, methods for efficiently processing the message authentication code for integrity (MAC-I) field (e.g., 4 bytes) added or attached at the end of the data are proposed below.

First method for processing a MAC-I field: First method of processing a MAC-I field: In the first method of processing the MAC-I field, a method of processing the MAC-I field in different methods for each bearer is proposed.

In the first method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured or not applied for the SRB, the MAC-I field still exists, or the MAC-I field is added or attached at the end of the data, but the MAC-I field may be padded or filled with the padding bits configured to 0.

In the first method of processing the MAC-I field, for the DRB, in only the case that the integrity protection function or integrity verification function is configured or applied to the DRB, the MAC-I field exists for the DRB, or the MAC-I field may be added or attached at the end of the data. In the above, the MAC-I field value may be configured to a value calculated by the above-configured integrity protection function or algorithm. For example, if the integrity protection function or integrity verification function is not configured or not applied to the DRB, the MAC-I field does not exist or the MAC-I field is not added or attached at the end of the data.

In the above, it may be characterized in that the integrity protection function or integrity verification function is performed or not applied to PDCP control data (e.g., PDCP state report, header compression protocol feedback, data compression protocol feedback, or configuration information). Also, it is characterized in that the MAC-I field may not be added to the PDCP control data, and the PDCP control data may be indicated through an indicator (D/C field) of the PDCP header. Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Second method of processing a MAC-I field: In the second method of processing the MAC-I field, a method of processing the MAC-I field in different methods for each bearer is proposed.

In the second method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with the padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the second method of processing the MAC-I field, for the DRB, in only the case that the integrity protection function or integrity verification function is configured, activated, resumed, or applied to the DRB, the MAC-I field exists for the DRB, or the MAC-I field may be added or attached at the end of the data. In the above, the MAC-I field value may be configured to a value calculated by the above-configured integrity protection function or algorithm. For example, if the integrity protection function or integrity verification function is not configured, deactivated, stopped, released, or not applied to the DRB, the MAC-I field does not exist or the MAC-I field is not added or attached at the end of the data. In the above, after the integrity protection function or integrity verification function is configured for a certain bearer, if the integrity protection function or integrity verification function can be activated, resumed, not configured, released, deactivated, or stopped, it cannot be recognized whether the MAC-I field exists for certain data or whether the MAC-I field is attached or added at the end of the data. For example, if the integrity protection function or integrity verification function is configured or activated for a certain bearer and used, and then deactivated or stopped by the above proposed RRC message, MAC control information, RLC control information, or PDCP control information, the MAC-I field may exist up to some data among the transmitted data (or the MAC-I field is added at the end of the data), or the MAC-I field may not exist from some data among the transmitted data (or the MAC-I field is not added at the end of the data).

Therefore, when the receiving terminal receives the data, it is necessary to know whether the MAC-I field exists or does not exist for the data in order to process the data. Thus, the 1-bit indicator of the PDCP header may indicate whether the MAC-I field exists, whether the integrity protection function is applied, or whether the integrity verification function (or bypass) is applied. In another method, the 1-bit indicator of the PDCP header may be defined and used as a toggle bit. For example, if the integrity protection function is applied, activated, resumed, or changed, the 1-bit indicator of the PDCP header is configured to 1 (or 0) continuously, if the integrity protection function is deactivated, stopped, released, or not applied, the 1-bit indicator of the PDCP header may be configured to 0 (or 1) continuously.

In another method, the PDCP control information may be newly defined to know whether the MAC-I field exists or does not exist for the data received by the receiving terminal, and the PDCP control information may be transmitted by including the PDCP serial number or COUNT value of data where the MAC-I field exists or does not exist lastly (or data where the MAC-I field does not exist or exists for the first time). Alternatively, the PDCP control information may be transmitted by including the PDCP serial number or COUNT value of the first data (or last data) for which the presence or absence of the MAC-I field is changed or for which the application or non-application of the integrity protection function is changed. In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Third method for processing a MAC-I field: In the third method of processing the MAC-I field, a method of processing the MAC-I field in different methods for each bearer is proposed.

In the third method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with the padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the third method of processing the MAC-I field, for the DRB, in only the case that the integrity protection function or integrity verification function is configured to the DRB, the MAC-I field exists or the MAC-I field may be added or attached at the end of the data. In the above, the MAC-I field value may be configured to a value calculated by the above-configured integrity protection function or algorithm. In the above, after the integrity protection function or integrity verification function is configured for a certain bearer, if the integrity protection function or integrity verification function can be activated, resumed, not configured, released, deactivated, or stopped, or even if the integrity protection function or integrity verification function can be activated, resumed, not configured, released, deactivated, or stopped, the MAC-I field always exists for the certain barrier or the MAC-I field may be attached or added at the end of the data. For example, if the integrity protection function or integrity verification function is configured, stopped, released, deactivated, or not applied for the DRB, the MAC-I field still exists, or the MAC-I field is added or attached at the end of the data, but the MAC-I field may be padded or filled with the padding bits configured to 0.

In another method, the MAC-I field may be defined as a special value other than the above padding bits configured to 0 and may be used to indicate that the integrity protection function is not applied. If the integrity protection function or integrity verification function is configured, activated, resumed, or applied for the DRB, the MAC-I field may exist, or the MAC-I field may always be added or attached at the end of the data, and the MAC-I field value may be configured to a value calculated by the above configured integrity protection function or algorithm.

Therefore, the receiving terminal first identifies the MAC-I field value and identifies whether the MAC-I field is filled with the padding bits configured to 0 or has a defined special value. If the MAC-I field value is not filled with the padding bits configured to 0, or does not have a defined special value, the integrity verification procedure can be performed. If the MAC-I field value is filled with the padding bits configured to 0 or has a defined special value, the integrity verification function may not be performed. For example, if the integrity protection function or integrity verification function is configured or activated for a certain bearer and used, and then deactivated or stopped by the proposed RRC message, MAC control information, RLC control information, or PDCP control information, the MAC-I field may exist up to some data among the transmitted data (or the MAC-I field is added at the end of the data), or the MAC-I field may exist from some data among the transmitted data but may have the value padded as 0 or a special value.

Therefore, when the receiving terminal receives the data, it is necessary to know whether the MAC-I field has the value padded as 0 or a special value for the date in order to process the data, so the MAC-I field value may be identified first. In another method, the 1-bit indicator of the PDCP header may indicate whether the MAC-I field is configured with a special value, or whether the integrity protection function is applied, or whether the integrity verification function (or bypass) is applied.

In another method, the 1-bit indicator of the PDCP header may be defined and used as a toggle bit. For example, if the integrity protection function is applied, activated, resumed, or changed, the 1-bit indicator of the PDCP header is configured to 1 (or 0) continuously, if the integrity protection function is deactivated, stopped, released, or not applied, the 1-bit indicator of the PDCP header may be configured to 0 (or 1) continuously. In another method, the PDCP control information may be newly defined to know whether the MAC-I field has a special value for the data received by the receiving terminal in the above, and the PDCP control information may be transmitted by including the PDCP serial number or COUNT value of data where the MAC-I field has a special value lastly (or data where the MAC-I field with a special value exists for the first time). Alternatively, the PDCP control information may be transmitted by including the PDCP serial number or COUNT value of the first data (or last data) for which the application or non-application of the integrity protection function is changed.

In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data. Also, the MAC-I field processing method for the DRB may be extended and applied to the SRB.

Fourth method for processing a MAC-I field: In the fourth method of processing the MAC-I field, a method of processing the MAC-I field in different methods for each bearer is proposed.

In the fourth method of processing the MAC-I field, the MAC-I field may always exist for the SRB, or the MAC-I field may always be added or attached at the end of the data. In the above, the MAC-I field value may be configured to a value calculated by the above configured integrity protection function or algorithm. If the integrity protection function or integrity verification function is not configured, stopped, released, deactivated, or not applied for the SRB, the MAC-I field still exists, or the MAC-I field is added or attached at the end of the data, but the MAC-I field may be padded or filled with the padding bits configured to 0. If the integrity protection function or integrity verification function is configured, activated, resumed, or applied for the SRB, the MAC-I field may exist, or the MAC-I field may always be added or attached at the end of data. The MAC-I field value may be configured to a value calculated by the above configured integrity protection function or algorithm.

In the fourth method of processing the MAC-I field, for the DRB, in the case that the integrity protection function or integrity verification function is configured to the DRB, or in the case that the integrity protection function is applied to data, the MAC-I field exists for the data, or the MAC-I field may be added or attached at the end of the data. In the above, the MAC-I field value may be configured to a value calculated by the above-configured integrity protection function or algorithm. For example, if the integrity protection function or integrity verification function is not configured for the DRB, or the integrity protection function is not applied to data, the MAC-I field does not exist for the data, or the MAC-I field may not be added or attached at the end of the data. For example, the integrity protection function may be applied or not applied to each data based on the PDU session information, QoS flow identifier information, QoS flow information, or upper layer device information configured through the RRC message proposed in the disclosure, and in only the case of application of the integrity protection function, the value of the MAC-I field can be calculated and the MAC-I field can be attached at the end of the data. In addition, the 1-bit indicator of the PDCP header may indicate whether the integrity protection function is applied to the data or whether the MAC-I field exists.

In another method, after the integrity protection function or integrity verification function is configured for a certain bearer in the above, if the integrity protection function or integrity verification function may be activated, resumed, not configured, released, deactivated, or stopped, or if the integrity protection function may be applied to some data or is not applied to some data, or even if the integrity protection function or integrity verification function may be activated, resumed, not configured, released, deactivated, or stopped, or even if the integrity protection function may be applied to some data or not applied to some data, the MAC-I field always exists, or the MAC-I field may be added or attached at the end of the data. For example, if the integrity protection function or integrity verification function is configured, stopped, released, deactivated, not applied for the DRB, or even if the integrity protection function is not applied to some data, the MAC-I field still exists, or the MAC-I field is added or attached at the end of the data, but the MAC-I field may be padded or filled with the padding bits configured to 0.

In another method, the MAC-I field may be defined as a special value other than the above padding bits configured to 0 and may be used to indicate that the integrity protection function is not applied. If the integrity protection function or integrity verification function is configured, activated, resumed, or applied for the DRB, or the integrity protection function is applied for some data, the MAC-I field may exist, or the MAC-I field may always be added or attached at the end of the data, and the MAC-I field value may be configured to a value calculated by the above configured integrity protection function or algorithm.

Therefore, the receiving terminal first identifies the MAC-I field value and identifies whether the MAC-I field is filled with the padding bits configured to 0 or has a defined special value. If the MAC-I field value is not filled with the padding bits configured to 0, or does not have a defined special value, the integrity verification procedure can be performed. If the MAC-I field value is filled with the padding bits configured to 0 or has a defined special value, the integrity verification function may not be performed.

Therefore, when the receiving terminal receives the data, it is necessary to know whether the MAC-I field has the value padded as 0 or a special value for the date in order to process the data, so the MAC-I field value may be identified first. In another method, the 1-bit indicator of the PDCP header may indicate whether the MAC-I field is configured with a special value, or whether the integrity protection function is applied, or whether the integrity verification function (or bypass) is applied.

In another method, the 1-bit indicator of the PDCP header may be defined and used as a toggle bit. In the above, it may be characterized in that the integrity protection function or integrity verification function is performed or not applied to the PDCP control data (e.g., PDCP state report, header compression protocol feedback, data compression protocol feedback, or configuration information). In addition, it may be characterized in that the MAC-I field may not be added to the PDCP control data, and the PDCP control data may be indicated through an indicator (D/C field) of the PDCP header.

Therefore, in the case that the receiving terminal identifies the PDCP control data through the indicator (D/C field) of the PDCP header, it can be recognized that the MAC-I field is not added or attached at the end of the PDCP control data.

Also, the MAC-I field processing method for the DRB may be extended and applied to the SRB.

In the disclosure, the bearer may have a meaning including an SRB and a DRB, and the SRB means a signaling radio bearer and indicates a bearer that transmits or receives an RRC message. Also, the DRB means a data radio bearer, and indicates a bearer that transmits or receives user data for each service. Additionally, the UM DRB means a DRB using an RLC layer device operating in unacknowledged mode (UM) to support low transmission delay, and the AM DRB means a DRB using an RLC layer device operating in acknowledged mode (AM) to guarantee lossless data transmission. In addition, the SRB is characterized in that it always uses an RLC layer device operating in AM mode to guarantee lossless data transmission. The SRB may have a meaning including SRB1, SRB2, SRB3, or SRB4.

The operation of the transmitting PDCP layer device of a UE or base station proposed in the disclosure is as follows.

When the transmitting PDCP layer device processes data, it uses a first COUNT variable to hold the COUNT value to be assigned to the data to be transmitted next, and the first COUNT variable may be referred to as TX_NEXT.

The operation of a transmitting PDCP layer device proposed in the disclosure is as follows.

When the transmitting PDCP layer device receives data (e.g., PDCP SDU) from an upper layer, it drives a PDCP data discard timer, and discards the data when the timer expires.

Then, the transmitting PDCP layer device assigns the COUNT value corresponding to TX_NEXT to the data received from the upper layer. TX_NEXT may be initially configured to 0, and TX_NEXT maintains the COUNT value for data to be transmitted next (PDCP SDU).

If a header compression protocol is configured, the transmitting PDCP layer device performs header compression on the data.

If integrity protection is configured, the transmitting PDCP layer device generates a PDCP header and performs integrity protection on the PDCP header and the data by using a security key and a COUNT value of TX_NEXT assigned to the data.

Also, the transmitting PDCP layer device performs the ciphering procedure on the data by using a security key and the COUNT value of TX_NEXT assigned to the data. Then, it configures the same number of lower LSBs as the PDCP sequence number length from the COUNT value of the TX_NEXT variable as the PDCP sequence number.

Then, the transmitting PDCP layer device increases the COUNT value of the TX_NEXT variable by 1, and concatenates the data processed above and the PDCP header together and transmits it to a lower layer.

Figure 6:
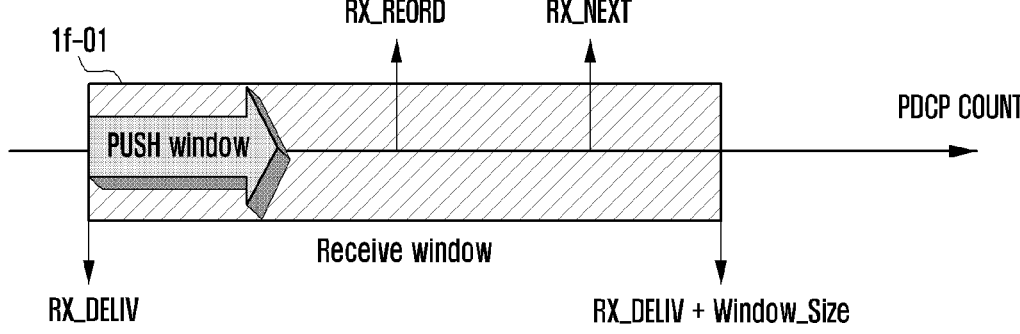
FIG. 6 is a diagram illustrating an operation of a receiving PDCP layer device and an integrity protection function, integrity verification function, ciphering function or deciphering function in the disclosure.
Figure 6:
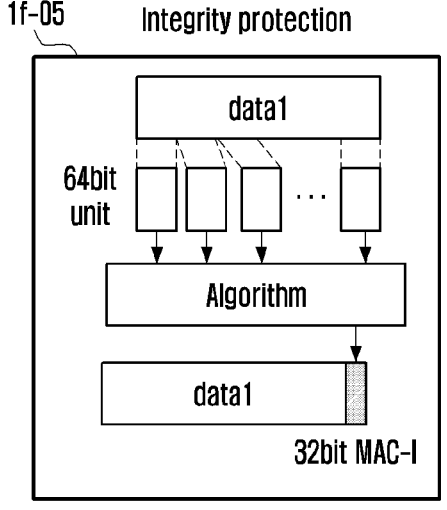
Figure 6:
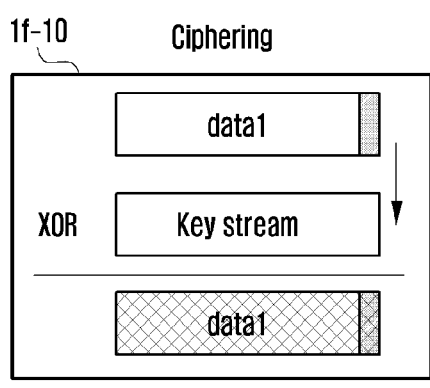

FIG. 6 is a diagram illustrating the operation of the receiving PDCP layer device and the integrity protection function, integrity verification function, ciphering function, or deciphering function in the disclosure.

The receiving PDCP layer device may use the PDCP sequence number length (e.g., 12 bits or 18 bits) configured by the base station through RRC, and may identify the PDCP sequence number of received data (e.g., PDCP PDU) and drive a receive window. Here, the receive window may be configured to a size of half the PDCP sequence number space (e.g., 2^(PDCP SN length−1)), and is used to distinguish valid data. That is, the receiving PDCP layer device determines that data received outside the receive window is invalid data and discards it. The reason why data arrives outside the receive window is that the data may arrive very late from a lower layer device due to retransmission of the RLC layer device or HARQ retransmission of the MAC layer device. Also, the receiving PDCP layer device may drive a PDCP reordering timer (t-Reordering timer) together with the receive window.

In the above description, the PDCP reordering timer is triggered when a PDCP sequence number gap occurs with respect to the PDCP sequence number; if the data corresponding to the PDCP sequence number gap does not arrive until the PDCP reordering timer expires, the receiving PDCP layer device delivers data to the upper layer device in order of the PDCP sequence number or in ascending order of the COUNT value and moves the receive window. Hence, if the data corresponding to the PDCP sequence number gap arrives after the PDCP reordering timer expires, it is discarded because it is not data within the receive window.

As illustrated in 1f-05 of FIG. 6, in the case that the integrity protection procedure is configured, the integrity protection procedure may perform the integrity protection procedure based on the security keys derived or applied from an upper layer device (e.g., an RRC layer device, or a NAS layer device), the COUNT value corresponding to the data to which the integrity protection procedure is applied, or the bearer identifiers corresponding to the data. For example, the data to which the integrity protection procedure is applied is calculated according to the integrity protection algorithm in units of 8 bytes (64 bits), and finally a 4 bytes (32 bits) MAC-I is calculated, and the message authentication code for integrity (MAC-I) field can be attached to the very end of the data.

The integrity verification procedure at the receiving terminal compares the 4-byte X-MAC field value obtained by conversely applying the integrity verification algorithm to the received data and the MAC-I value attached to the data, and if the two values are the same, it may be determined that the integrity verification of the data has been carried out successfully. If the two values are different, it may be determined that the integrity verification has failed and the data may be discarded. As such, the integrity protection procedure or the integrity protection procedure is a very complex procedure, has high data processing complexity, and takes a long time to process the data.

As in 1f-10, the ciphering procedure can be performed in the case that the ciphering procedure is configured. For example, based on the security keys derived or applied from an upper layer device (e.g., an RRC layer device or NAS layer device), a COUNT value corresponding to data to which ciphering is applied, or bearer identifiers corresponding to data, a key stream having the same length as the data may be generated through a ciphering algorithm. In addition, ciphered data may be generated by performing an XOR procedure on the generated key stream and the data to be ciphered. Conversely, the receiving terminal may perform the deciphering procedure by performing the XOR procedure on the ciphered data that has received the key stream generated through the deciphering algorithm. As such, the ciphering procedure or the deciphering procedure is a very complex procedure, and the data processing complexity is high, and the data processing time is long.

The detailed procedure of the receiving PDCP layer 1f-01 device briefly described above is as follows.

The operations of the receiving PDCP layer device of a UE or base station proposed in the disclosure are as follows.

The receiving PDCP layer device maintains and manages three COUNT variables when processing received data. When processing received data, the receiving PDCP layer device uses a second COUNT variable to maintain the COUNT value of data expected to be received next (e.g., PDCP SDU), and the second COUNT variable may be referred to as RX_NEXT. Also, when processing received data, the receiving PDCP layer device uses a third COUNT variable that maintains the COUNT value of the first data (e.g., PDCP SDU) that is not delivered to an upper layer, and the third COUNT variable may be referred to as RX_DELIV. Further, when processing received data, the receiving PDCP layer device uses a fourth COUNT variable that maintains the COUNT value of the data (e.g., PDCP SDU) having triggered the PDCP reordering timer (t-Reordering timer), and the fourth COUNT variable may be referred to as RX_REORD. Further, when processing received data, the receiving PDCP layer device uses a fifth COUNT variable that maintains the COUNT value of the currently received data (e.g., PDCP SDU), and the fifth COUNT variable may be referred to as RCVD_COUNT. Here, the PDCP reordering timer uses a timer value or interval configured by an upper layer (RRC layer) through an RRC message as in FIG. 5, and this timer is used to detect a lost PDCP PDU, and only one timer is driving at a time.

In addition, the UE may define and use the following variables for the operation of the receiving PDCP layer device.

HFN: indicates the hyper frame number (HFN) part of the window state variables

SN: indicates the sequence number (SN) part of the window state variables

RCVD_SN: PDCP sequence number included in the header of a received PDCP PDU

RCVD_HFN: HFN value calculated by the receiving PDCP layer device from the received PDCP PDU Detailed operations of the receiving PDCP layer device proposed in the disclosure are as follows.

When a PDCP PDU is received from a lower layer, the receiving PDCP layer device may determine the COUNT value of the received PDCP PDU as follows.

If received RCVD_SN is RCVD_SN<SN(RX_DELIV)− Window_Size,

Update to RCVD_HFN=HFN(RX_DELIV)+1.

Else if RCVD_SN is RCVD_SN>SN(RX_DELIV)+Window_Size,

Update to RCVD_HFN=HFN(RX_DELIV)−1.

If the above is not the case,

Update to RCVD_HFN=HFN(RX_DELIV).

RCVD_COUNT is determined as RCVD_COUNT= [RCVD_HFN, RCVD_SN].

After determining the COUNT value of the received PDCP PDU, the receiving PDCP layer device may update the window state variables and process the PDCP PDU as follows.

Perform deciperation on the PDCP PDU by using the RCVD_COUNT value, and perform integrity verification.

If integrity verification fails,

Indicate integrity verification failure to the upper layer, and discard the received PDCP Data PDU (data part of PDCP PDU).

If RCVD_COUNT<RX_DELIV or if a PDCP PDU having a value of RCVD_COUNT has been previously received (the case where the PDCP reordering timer expires, the period has elapsed, or a packet has arrived outside the receive window, or a packet is duplicated), Discard the received PDCP Data PDU (data part of PDCP PDU).

If the PDCP PDU received above is not discarded, the receiving PDCP layer device may operate as follows.

Store the PDCP SDU processed above in the receive buffer.

If RCVD_COUNT>=RX_NEXT,

Update RX_NEXT with RCVD_COUNT+1.

If out-of-order delivery indicator (outOfOrderDelivery) is configured (or, if the receiving PDCP layer device indicates an out-of-order delivery operation), Deliver the PDCP SDU to an upper layer.

If RCVD_COUNT is equal to RX_DELIV,

If the PDCP SDU has not previously header-decompressed, perform header decompression and deliver it to an upper layer in order of COUNT values.

Deliver all successive PDCP SDUs starting from the value of COUNT=RX_DELIV to the upper layer.

Update RX_DELIV value with COUNT value greater than or equal to current RX_DELIV and corresponding to the first PDCP SDU not delivered to the upper layer.

If the t-Reordering timer is driving and RX_DELIV value is greater than or equal to RX_REORD, Stop and reset the t-Reordering timer.

If the t-Reordering timer is not driving (including the case where the t-Reordering timer is stopped) and RX_DELIV is less than RX_NEXT, Update RX_REORD value with RX_NEXT.

Start t-Reordering timer.

When the PDCP reordering timer (t-Reordering timer) expires, the receiving PDCP layer device may operate as follows.

If the PDCP SDU has not previously header-decompressed, perform header decompression and deliver it to an upper layer in order of COUNT values.

Deliver all PDCP SDUs with COUNT values less than RX_REORD value.

Deliver all PDCP SDUs with consecutive COUNT values starting from RX_REORD value.

Update RX_DELIV value with COUNT value greater than or equal to RX_REORD and corresponding to the first PDCP SDU not delivered to the upper layer.

If RX_DELIV value is less than RX_NEXT value,

Update RX_REORD value with RX_NEXT.

Start t-Reordering timer.

A first embodiment of handling integrity verification failure in the operation of the receiving PDCP layer device of the disclosure is as follows.

If the receiving PDCP layer device fails to verify the integrity of received data, Indicate an integrity verification failure to an upper layer (e.g., RRC layer device), and discard the received PDCP Data PDU (data part of PDCP PDU).

The first embodiment for handling integrity verification failure proposed in the disclosure is characterized in that the receiving PDCP layer device performs an integrity verification procedure on received data, indicates an integrity verification failure to an upper layer device (e.g., RRC layer device) whenever an integrity verification failure occurs, and discards the data that has failed integrity verification. However, it is characterized in that the UE performs different operations for individual bearers as follows.

The operation of the UE per bearer in response to the integrity verification failure proposed in the first embodiment is as follows.

1> If the RRC layer device receives an indication of integrity verification failure from a lower layer device (e.g., PDCP layer device), 2> If the lower layer device (e.g., PDCP layer device) is connected to or configured with an SRB (e.g., SRB1, SRB2, or SRB3), 3> The RRC layer device of the UE triggers an RRC connection reestablishment procedure, and reestablishes a connection with the network 2> If the lower layer device (e.g., PDCP layer device) is connected to or configured with a DRB, 3> The RRC layer device of the UE ignores the indication of the integrity verification failure. Alternatively, the RRC layer device of the JE does not perform any operation even when receiving the integrity verification failure.

A second embodiment of the disclosure proposes a more efficient operation of handling integrity verification failures although based on the operation of the transmitting PDCP layer device and the operation of the receiving PDCP layer device proposed in the first embodiment.

The second embodiment is characterized in that the receiving PDCP layer device performs an integrity verification procedure on received data, indicates an integrity verification failure to an upper layer device (e.g., RRC layer device) whenever an integrity verification failure occurs, and discards the data that has failed integrity verification. However, it is characterized in that different UE operations are performs per bearer as follows.

The operation of the UE per bearer in response to the integrity verification failure proposed in the second embodiment is as follows.

1> If the receiving PDCP layer device fails to verify the integrity of received data, or the receiving PDCP layer device is configured with or connected to an SRB or DRB, 2> Indicate an integrity verification failure to an upper layer (e.g., RRC layer device), and discard the received PDCP Data PDU (data part of PDCP PDU)

1> If the RRC layer device receives an indication of integrity verification failure from a lower layer device (e.g., PDCP layer device), 2> If the lower layer device (e.g., PDCP layer device) is connected to or configured with an SRB (e.g., SRB1, SRB2, or SRB3), 3> The RRC layer device of the UE triggers an RRC connection reestablishment procedure, and reestablishes a connection with the network.

2> If the lower layer device (e.g., PDCP layer device) is connected to or configured with a DRB (or, if the lower layer device is not connected to an SRB), 3> Increment the first variable, which counts and stores the number of times an integrity verification failure occurs, by 1, and store it (the first variable may be initialized to an initial value of 0, and the first variable may be separately defined for each bearer (e.g., DRB bearer identifier) and be used to count the number of integrity verification failures occurring in each bearer).

3> If the first variable value is greater than or equal to the number of integrity verification failures configured through the RRC message in FIG. 5, 4> The RRC layer device of the UE triggers an RRC connection reestablishment procedure, and reestablishes a connection with the network. As another method, the RRC layer device of the UE may compose an integrity verification failure report message and transmit it to the base station without triggering an RRC connection reestablishment procedure. The integrity verification failure report message may include information such as an indicator indicating whether an integrity verification failure has occurred, a bearer identifier, or a logical identifier.

4> Initialize the first variable to 0.

A third embodiment of the disclosure proposes a more efficient operation of handling integrity verification failures although based on the operation of the transmitting PDCP layer device and the operation of the receiving PDCP layer device proposed in the first embodiment.

In the third embodiment, the receiving PDCP layer device performs an integrity verification procedure on received data, indicates an integrity verification failure to an upper layer device (e.g., RRC layer device) whenever an integrity verification failure occurs in the SRB, and discards the data that has failed integrity verification. However, when an integrity verification failure occurs in the DRB, it is characterized in that the integrity verification failure is indicated to an upper layer device (e.g., RRC layer device) only in the case where it occurs more than a preset number of times. Specifically, it is characterized in that different UE operations are performed per bearer as follows. As described above, since the PDCP layer device does not repeatedly make an indication to an upper layer device (e.g., RRC layer device) whenever an integrity verification failure occurs in relation to the DRB, the processing load of the UE can be reduced.

The operation of the UE per bearer in response to the integrity verification failure proposed in the third embodiment is as follows.

1> If the receiving PDCP layer device fails to verify the integrity of received data and the receiving PDCP layer device is configured with or connected to an SRB, 2> Indicate an integrity verification failure to an upper layer (e.g., RRC layer device), and discard the received PDCP Data PDU (data part of PDCP PDU).

1> If the receiving PDCP layer device fails to verify the integrity of received data and the receiving PDCP layer device is configured with or connected to a DRB (or, if the receiving PDCP layer device is not connected to an SRB), 2> Increment the second variable, which counts and stores the number of times an integrity verification failure occurs, by 1, and store it (the first variable may be initialized to an initial value of 0, and the first variable may be separately defined for each bearer (e.g., DRB bearer identifier) and be used to count the number of integrity verification failures occurring in each bearer)

2> If the second variable value is greater than or equal to the number of integrity verification failures configured through the RRC message in FIG. 5, 3> Indicate an integrity verification failure to an upper layer (e.g., RRC layer device), and discard the received PDCP Data PDU (data part of PDCP PDU).

3> Initialize the second variable to 0.

1> If the RRC layer device receives an indication of integrity verification failure from a lower layer device (e.g., PDCP layer device), 2> If the lower layer device (e.g., PDCP layer device) is connected to or configured with an SRB (e.g., SRB1, SRB2, or SRB3), 3> The RRC layer device of the UE triggers an RRC connection reestablishment procedure, and reestablishes a connection with the network.

2> If the lower layer device (e.g., PDCP layer device) is connected to or configured with a DRB, 3> The RRC layer device of the UE triggers an RRC connection reestablishment procedure, and reestablishes a connection with the network. As another method, the RRC layer device of the UE may compose an integrity verification failure report message and transmit it to the base station without triggering an RRC connection reestablishment procedure. The integrity verification failure report message may include information such as an indicator indicating whether an integrity verification failure has occurred, a bearer identifier, or a logical identifier.

A fourth embodiment of the disclosure proposes a more efficient operation of handling integrity verification failures although based on the operation of the transmitting PDCP layer device and the operation of the receiving PDCP layer device proposed in the first embodiment.

In the fourth embodiment, the receiving PDCP layer device performs an integrity verification procedure on received data, indicates an integrity verification failure to an upper layer device (e.g., RRC layer device) whenever an integrity verification failure occurs in the SRB, and discards the data that has failed integrity verification. However, when an integrity verification failure occurs in the DRB, it is characterized in that the receiving PDCP layer device reports an integrity verification failure to the transmitting PDCP layer device through an indicator of the PDCP header or PDCP control data (e.g., PDCP state report or new PDCP control data) only in the case where integrity verification failure occurs more than a preset number of times. Specifically, it is characterized in that different UE operations are performed per bearer as follows. As described above, since the PDCP layer device does not make an indication to an upper layer device (e.g., RRC layer device) even when an integrity verification failure occurs with respect to the DRB, the processing load of the UE can be reduced.

The operation of the UE per bearer in response to the integrity verification failure proposed in the fourth embodiment is as follows.

1> If the receiving PDCP layer device fails to verify the integrity of received data and the receiving PDCP layer device is configured with or connected to an SRB, 2> Indicate an integrity verification failure to an upper layer (e.g., RRC layer device), and discard the received PDCP Data PDU (data part of PDCP PDU)

1> If the receiving PDCP layer device fails to verify the integrity of received data and the receiving PDCP layer device is configured with or connected to a DRB (or, if the receiving PDCP layer device is not connected to an SRB), 2> Increment the second variable, which counts and stores the number of times an integrity verification failure occurs, by 1, and store it (the first variable may be initialized to an initial value of 0, and the first variable may be separately defined for each bearer (e.g., DRB bearer identifier) and be used to count the number of integrity verification failures occurring in each bearer).

2> If the second variable value is greater than or equal to the number of integrity verification failures configured through the RRC message in FIG. 5, 3> The receiving PDCP layer device reports an integrity verification failure to the transmitting PDCP layer device through an indicator of the PDCP header or PDCP control data (e.g., PDCP state report or new PDCP control data), and discards the received PDCP Data PDU (data part of PDCP PDU).

3> Initialize the second variable to 0

1> If the RRC layer device receives an indication of integrity verification failure from a lower layer device (e.g., PDCP layer device), 2> If the lower layer device (e.g., PDCP layer device) is connected to or configured with an SRB (e.g., SRB1, SRB2, or SRB3), 3> The RRC layer device of the UE triggers an RRC connection reestablishment procedure, and reestablishes a connection with the network 2> If the lower layer device (e.g., PDCP layer device) is connected to or configured with a DRB, 3> The RRC layer device of the UE ignores the indication of the integrity verification failure, or does not perform any operation even when receiving the integrity verification failure.

A fifth embodiment of the disclosure proposes a more efficient operation of handling integrity verification failures although based on the operation of the transmitting PDCP layer device and the operation of the receiving PDCP layer device proposed in the first embodiment.

In the fifth embodiment, the receiving PDCP layer device performs an integrity verification procedure on received data, indicates an integrity verification failure to an upper layer device (e.g., RRC layer device) whenever an integrity verification failure occurs in the SRB, and discards the data that has failed integrity verification. However, when an integrity verification failure occurs in the DRB, it is characterized in that the receiving PDCP layer device reports an integrity verification failure to the transmitting PDCP layer device through an indicator of the PDCP header or PDCP control data (e.g., PDCP state report or new PDCP control data). Specifically, it is characterized in that different UE operations are performed per bearer as follows. As described above, since the PDCP layer device does not make an indication to an upper layer device (e.g., RRC layer device) even when an integrity verification failure occurs in relation to the DRB, the processing load of the UE can be reduced.

The operation of the UE per bearer in response to the integrity verification failure proposed in the fifth embodiment is as follows.

1> If the receiving PDCP layer device fails to verify the integrity of received data and the receiving PDCP layer device is configured with or connected to an SRB, 2> Indicate an integrity verification failure to an upper layer (e.g., RRC layer device), and discard the received PDCP Data PDU (data part of PDCP PDU).

1> If the receiving PDCP layer device fails to verify the integrity of received data and the receiving PDCP layer device is configured with or connected to a DRB (or, if the receiving PDCP layer device is not connected to an SRB), 2> The receiving PDCP layer device reports an integrity verification failure to the transmitting PDCP layer device through an indicator of the PDCP header or PDCP control data (e.g., PDCP state report or new PDCP control data), and discards the received PDCP Data PDU (data part of PDCP PDU).

1> If the RRC layer device receives an indication of integrity verification failure from a lower layer device (e.g., PDCP layer device), 2> If the lower layer device (e.g., PDCP layer device) is connected to or configured with an SRB (e.g., SRB1, SRB2, or SRB3), 3> The RRC layer device of the UE triggers an RRC connection reestablishment procedure, and reestablishes a connection with the network 2> If the lower layer device (e.g., PDCP layer device) is connected to or configured with a DRB, 3> The RRC layer device of the UE ignores the indication of the integrity verification failure, or does not perform any operation even when receiving the integrity verification failure.

By applying the second embodiment, the third embodiment, the fourth embodiment, or the fifth embodiment proposed above in the disclosure for efficiently handling integrity verification failures, when the transmitting PDCP layer device (e.g., base station) receives a report that an integrity verification failure has occurred in relation to the DRB through an RRC message or an indicator of the PDCP header or PDCP control data, the base station may remap QoS flows, which are mapped to the bearer corresponding to or connected to the PDCP layer device, to another bearer (or, default DRB). That is, in the case that an integrity verification failure occurs in relation to a DRB, as RRC connection reestablishment causes data transmission delay, the base station no longer performs data transmission and reception through the bearer in which an integrity verification failure has occurred, configures the UE with a configuration to map QoS flows (e.g., data services) mapped to the above bearer to another bearer, and performs data transmission and reception for the QoS flows through the other bearer, so that it is possible to prevent data transmission delay and enhance security. This is because integrity verification failure is caused by a protocol error or a hacker's attack, and it is desirable not to use the bearer having failed integrity verification any more, assuming that the bearer has been exposed to attack.

In addition, as a method of UE implementation in the above embodiments, to reduce the processing load for the receiving PDCP layer device to make an indication to an RRC layer device whenever an integrity verification failure occurs, in the case of the DRB, even if an integrity verification failure occurs, the receiving PDCP layer device may be implemented so that it does not indicate the integrity verification failure to the RRC layer device.

In another method, when the integrity protection function or integrity verification function is configured, in the case that the integrity verification failure occurs for the data received from the receiving PDCP layer device or MAC layer device, the disclosure proposes a method of efficiently processing an integrity verification failure. In the above, when integrity verification failure occurs, different processing methods for each bearer (e.g., SRB or DRB) are proposed below.

A first method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or a MAC layer device) may indicate the integrity verification procedure failure (integrity verification failure or integrity check failure) to an upper layer device (e.g., an RRC layer device).

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded 1> If the RRC layer device receives an integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

A second method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or the MAC layer device) may indicate the integrity verification failure procedure (integrity verification failure or integrity check failure) to the upper layer device (e.g., the RRC layer device). In the above, if the integrity verification failure occurs and the PDCP layer device is connected to the DRB, when the integrity verification failure occurs more than a predetermined number of times, the upper layer device may be instructed. For example, a first variable may be newly introduced in order to identify whether the number of occurrence of integrity verification failures is greater than or equal to a predetermined number of times, and each time the integrity verification failure occurs for the received data, the value of the first variable may be increased by 1, and if the variable value is greater than or equal to the predetermined number of times, the integrity verification failure may be indicated to the upper layer device. In addition, when the integrity verification failure is indicated in the upper layer device, the value of the first variable may be initialized to 0. In the above, the predetermined number of times may be configured through the RRC messages for each bearer or for each uplink or downlink. In the above method, since it is not necessary to continuously perform an indication for the integrity verification failure that occurs continuously to the upper layer device, the processing load can be reduced. In another method, if the integrity verification failure occurs and the PDCP layer device is connected to the DRB, the upper layer device may be instructed only once for multiple integrity verification failures occurring within a predetermined time. For example, if a first timer is introduced and the integrity verification failure occurs in the above, the PDCP layer device drives or starts the first timer, and when the first timer is driving, the integrity failure may not be indicated to the upper layer device even if the integrity verification failure occurs. Alternatively, when the first timer expires, the integrity verification failure may be indicated to the upper layer device. In another method, the PDCP layer device may indicate the integrity verification failure to the upper layer device when driving the first timer, or when starting the first timer, or before driving or starting the first timer, or the PDCP layer device may indicate the integrity verification failure to the upper layer device only when the first timer is not driving. The first timer may be stopped when the bearer (or the PDCP layer device) is released or reestablished. In the above, the first timer value may be configured for each bearer or for each downlink or uplink through the RRC message. The integrity verification failure report or indication procedure may be extended and applied to the MAC layer device. Alternatively, the PDCP state report may be triggered to report the state of data received so far when the integrity verification failure is indicated to the upper layer device.

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded.

1> If the RRC layer device receives the integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

1> If the RRC layer device receives the integrity verification failure indicator from the lower layer device (e.g., the MAC layer device or the MAC layer device of MCG), or the lower layer device (e.g., the PDCP layer device) related or connected to the DRB (e.g., the DRB connected to MCG or SCG), 2> The UE may suspend the configured DRBs or the DRBs belonging to the cell group (e.g., MCG or SCG). In another method, only the DRBs connected or mapped to the PDU session to which the DRB in which the integrity verification failure is indicated belongs may be suspended. In another method, only the DRB in which the integrity verification failure is indicated in the above may be suspended. In the above, suspending the DRB means that the data transmission or reception for the DRB is suspended in the DRB protocol layer device (e.g., the SDAP layer device, PDCP layer device, RLC layer device, or MAC layer device), or a timer is stopped if the timer is driving, or a window variable update procedure is stopped as well. Therefore, if the number of DRBs suspended in the above procedure is decreased, the UE may continue to perform data transmission or reception through some DRBs. In addition, the procedure for suspending DRBs in the above may include a procedure for suspending the PDCP layer device (PDCP suspend), a PDCP layer device reestablishment procedure, or an RLC layer device reestablishment procedure. For example, if the timer is driving, the timer is stopped and the stored data is processed (e.g., hear decompression) and transmitted to the upper layer device, or the window variables may be initialized. In another method, the DRBs may not be suspended in order to continue data transmission or reception.

2> In the above, in order to report the integrity verification failure to the base station, the UE may constitute a failure report message and transmit it to the base station. The failure report message may include an indicator or cell-related identifier indicating that integrity verification failure occurred, or a bearer identifier or logical channel identifier where the integrity verification failure occurred, or information such as a COUNT value, occurrence time, or location of data in which the integrity verification failure occurred. In the above, the failure report message or indicator may be constituted in the RRC message, MAC control information, PDCP control information, or PDCP header, and transmitted. In another method, in the above, the UE may trigger the RRC connection reestablishment procedure. In addition, in the RRC connection reestablishment procedure, in the RRC connection establishment procedure, or after the connection establishment, when the UE reports a Radio Link Failure (RLF) to the base station through the RRC message, the report may include the integrity verification failure information (e.g., an indicator or cell-related identifier indicating that integrity verification failure occurred, a bearer identifier or logical channel identifier in which the integrity verification failure occurred, or information such as a COUNT value, occurrence time, or location of data in which the integrity verification failure occurred). In another method, in the above, the base station may request the RLF report or integrity verification failure report from the UE through the RRC message, and the UE may constitute the RRC message in response to the request of the base station and report the contents to the base station.

A third method for processing an integrity verification failure proposed by the disclosure is as follows.

1> When a PDCP layer device (or a MAC layer device) receives data (e.g., PDCP data PDU) from a lower layer device, the receiving PDCP layer device (or a MAC layer device) determines a COUNT value (or a security key value) for the received data, and may perform the deciphering procedure or integrity verification for the data using the COUNT value (or a security key value). For example, when the ciphering function, deciphering function, integrity protection function, or integrity verification function is configured in the above, the above procedure may be performed.

2> If the integrity verification procedure fails for the data in the integrity verification procedure, 3> The PDCP layer device (or a MAC layer device) may indicate the integrity verification procedure failure (integrity verification failure or integrity check failure) to an upper layer device (e.g., an RRC layer device).

3> The data (PDCP data PDU, MAC SDU, or MAC CE) that has failed the integrity verification procedure in the above may be discarded. In the above, when discarding data, only data (PDCP data PDU, MAC SDU, MAC control information, or a group of MAC control information) that has failed the integrity verification procedure may be discarded. In another method, in order to enhance security, if any one of the MAC SDU and MAC control information included in one MAC PDU fails the integrity verification procedure in the MAC layer device, the entire MAC PDU data may be discarded.

1> If the RRC layer device receives an integrity verification failure indicator from the lower layer device (e.g., the MAC layer device or the MAC layer device of MCG), a SRB (e.g., SRB1, SRB2, or SRB connected to MCG), or the lower layer device related to or connected to the DRB (e.g., the PDCP layer device) (or the case of the integrity verification failure detected when an RRCReestablishment message is received in an RRC connection reestablishment procedure (RRC Connection Re-establishment) may be excluded), 1> Alternatively, if the RRC layer device receives the integrity verification failure indicator from the lower layer device of SCG (e.g., the MAC layer device), the SRB (e.g., SRB3 or SRB connected to secondary cell group (SCG)), or the lower layer device related to or connected to the DRB (e.g., the PDCP layer device) during the master cell group (MCG) is suspended, 2> Timers (e.g., T310 or T312) for monitoring a wireless connection or for identifying whether the wireless connection is valid may be stopped.

2> The timer (e.g., T304) for handover may be stopped.

2> The timer (e.g., T311) for the RRC connection reestablishment procedure may be started. When the timer expires, the UE may transition to an RRC idle mode (RRC IDLE).

2> The MAC layer device may be initialized.

2> If SCells are configured in the MCG, the SCells may be released.

2> If dual connectivity (MR-DC, Multi-RAT Dual Connectivity) is configured, the dual connectivity may be released.

2> The UE may perform a cell selection or reselection procedure.

2> In the above, if the UE finds or selects a suitable cell, the UE may perform the RRC connection reestablishment procedure. In the RRC connection reestablishment procedure, an RRCReestablishmentRequest message is sent from the above selected suitable cell to identify whether data transmission or reception can be continued in the suitable cell, and if the cell accepts the reconnection or reestablishment, an RRCReestablishment message can be sent to the UE so that data transmission or reception may be continued for previously established bearers. In addition, the UE may transmit an RRRCreestalishment-Complete message to the base station. If the cell does not accept reconnection or reestablishment for to the UE in the above, an RRCSetup message or RRCReject message may be sent to the UE, or the RRC connection establishment procedure may be performed by the UE. In the above, if the UE fails the RRC connection reestablishment procedure, the UE transitions to the RRC idle mode, performs the cell selection or reselection procedure again, and may perform the RRC connection establishment procedure.

1> If the RRC layer device receives the integrity verification failure indicator from the lower layer device (e.g., the MAC layer device or the MAC layer device of MCG) or the lower layer device (e.g., the PDCP layer device) related or connected to the DRB (e.g., DRB connected to MCG or SCG), or if in the above, the integrity verification failure occurs and the integrity verification failure occurs more than a predetermined number of times in the lower layer device, the following procedure may be performed. For example, a first variable may be newly introduced to identify whether the number of occurrence of integrity verification failures is greater than or equal to a predetermined number of times, and the value of the first variable may be increased by 1 whenever the integrity verification failure indication is received. If the variable value is greater than or equal to the predetermined number of times, the following procedure may be performed. Also, when the following procedure is performed, the value of the first variable may be initialized to 0. In the above, the predetermined number of times may be configured for each bearer or for each uplink or down-link through the RRC message, and the predetermined number or first variable may be managed for each DRB, or the predetermined number or first variable may be managed for DRBs (all DRBs, DRBs belonging to the same PDU session, or DRBs belonging to the same cell group). In the above method, it is not necessary to continuously perform the following procedure for the continuously occurring integrity verification failure indication, so that the processing load can be reduced.

In another method, when the integrity verification failure is indicated, the following procedure may be performed only once for multiple integrity verification failures occurring within a certain period of time. For example, if a first timer is introduced and the integrity verification failure is indicated, the first timer is driven or started, and when the first timer is driving, the following procedure may not be performed even if the integrity verification failure is indicated. Alternatively, when the first timer expires, the following procedure may be performed. In another method, the following procedure may be performed when driving or starting the first timer, or before driving or starting the first timer, or the following procedure may be performed only when the first timer is not driving. The first timer may be stopped when the bearer (or the PDCP layer device) is released or reestablished. In the above, the first timer or timer value may be configured for each bearer or for each uplink or downlink through the RRC message, and the first timer or timer value may be managed for each DRB, or the first timer or timer value may be managed for the DRBs (all DRBs, DRBs belonging to the same PDU session, or DRBs belonging to the same cell group).

2> The UE may suspend the configured DRBs or the DRBs belonging to the cell group (e.g., MCG or SCG). In another method, only the DRBs connected or mapped to the PDU session to which the DRB in which the integrity verification failure is indicated belongs may be suspended. In another method, only the DRB in which the integrity verification failure is indicated in the above may be suspended. In the above, suspending the DRB means that the data transmission or reception for the DRB is suspended in the DRB protocol layer device (e.g., the SDAP layer device, PDCP layer device, RLC layer device, or MAC layer device), or a timer is stopped if the timer is driving, or a window variable update procedure is stopped as well. Therefore, if the number of DRBs suspended in the above procedure is decreased, the UE may continue to perform data transmission or reception through some DRBs. In addition, the procedure for suspending DRBs in the above may include a procedure for suspending the PDCP layer device (PDCP suspend), a PDCP layer device reestablishment procedure, or an RLC layer device reestablishment procedure. For example, if the timer is driving, the timer is stopped and the stored data is processed (e.g., hear decompression) and transmitted to the upper layer device, or the window variables may be initialized. In another method, the DRBs may not be suspended in order to continue data transmission or reception.

2> In the above, in order to report the integrity verification failure to the base station, the UE may constitute a failure report message and transmit it to the base station. The failure report message may include an indicator or cell-related identifier indicating that integrity verification failure occurred, or a bearer identifier or logical channel identifier where the integrity verification failure occurred, or information such as a COUNT value, occurrence time, or location of data in which the integrity verification failure occurred. In the above, the failure report message or indicator may be constituted in the RRC message, MAC control information, PDCP control information, or PDCP header, and transmitted. In another method, in the above, the UE may trigger the RRC connection reestablishment procedure. In another method, in the above, the UE may trigger the RRC connection reestablishment procedure. In addition, in the RRC connection reestablishment procedure, in the RRC connection establishment procedure, or after the connection establishment, when the UE reports a Radio Link Failure (RLF) to the base station through the RRC message, the report may include the integrity verification failure information (e.g., an indicator or cell-related identifier indicating that integrity verification failure occurred, a bearer identifier or logical channel identifier in which the integrity verification failure occurred, or information such as a COUNT value, occurrence time, or location of data in which the integrity verification failure occurred). In another method, in the above, the base station may request the RLF report or integrity verification failure report from the UE through the RRC message, and the UE may constitute the RRC message in response to the request of the base station and report the contents to the base station.

In the above, if the base station receives the integrity verification failure report indication for the DRB from the UE, the base station may transmit the RRC message indicating a handover to the UE for security or to prevent an attack, may release the bearer in which the integrity verification failure is indicated, and may configure a new bearer, and may change the QoS flow mapping mapped to the bearer in which the integrity verification failure is indicated to another bearer or a new bearer. For the bearer in which the integrity verification failure is indicated, the base station may indicate the PDCP reestablishment procedure or the RLC reestablishment procedure through the RRC message, or the base station may transmit to the UE the RRC message including the security configuration information for changing the security configuration information.

In addition, in the above, the base station may broadcast the system information whether the base station can read or support the integrity verification failure report message, or support a method for solving the integrity verification failure problem when the integrity verification failure problem occurs for the DRB. Also, the UE reads the system information and may perform the integrity verification failure processing procedure proposed in the disclosure only in the case where it is indicated that the base station reads or supports the integrity verification failure report message, or supports a method for solving the integrity verification failure problem when the integrity verification failure problem occurs for the DRB from the system information of the camped-on cell as described above. In addition, whether the base station can read or support the integrity verification failure report message, or whether the base station can support a method for solving the integrity verification failure problem when an integrity verification failure problem occurs for the DRB is informed or configured to the UE through the RRCSetup message, RRCResume message, or RRCReconfiguration message in the above.

Figure 7:
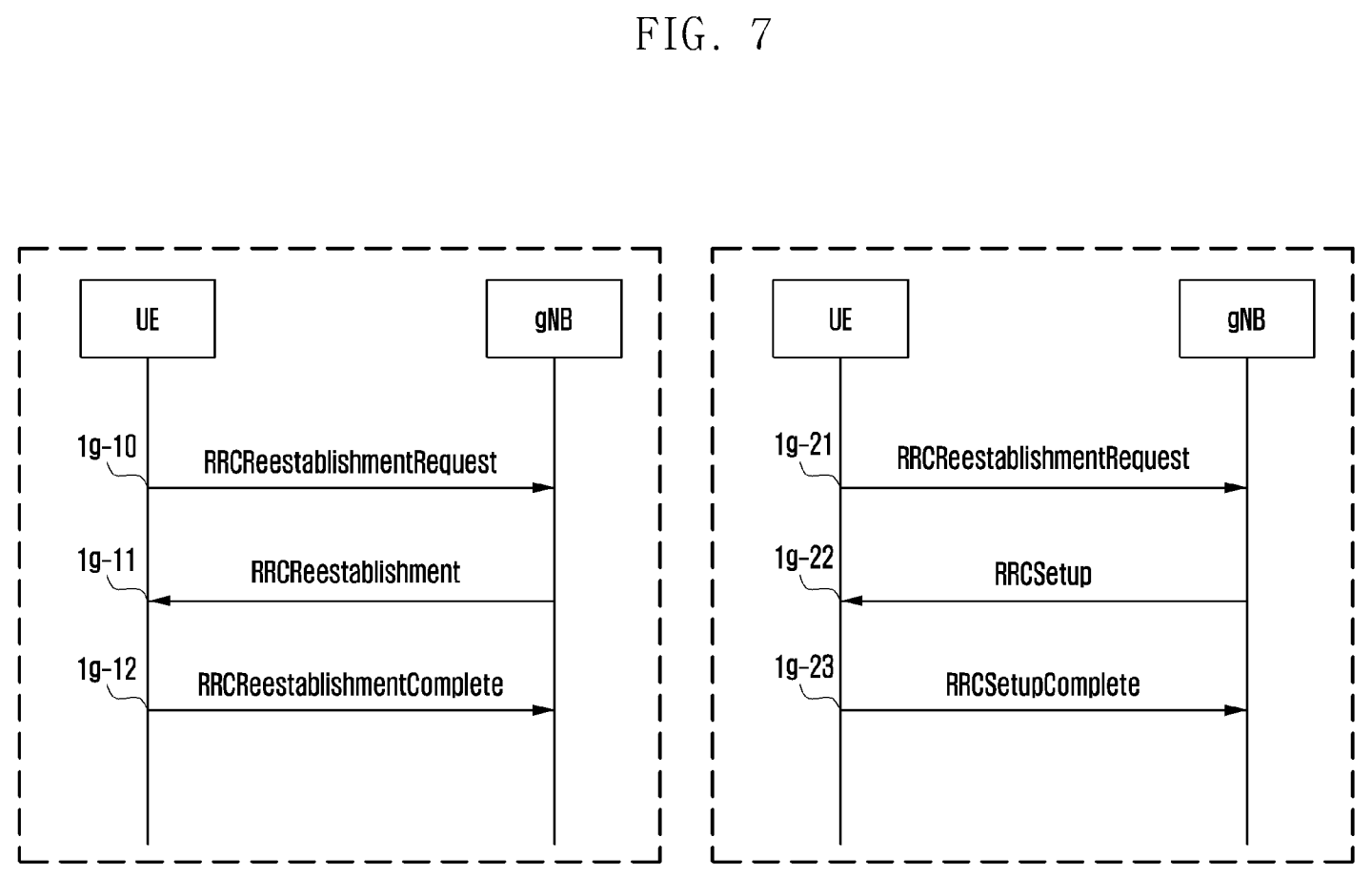

FIG. 7 is a diagram illustrating an RRC reestablishment procedure for the UE according to the disclosure.

In FIG. 7, the UE may trigger an RRC connection reestablishment procedure to reestablish a connection with the network in the case that the network connection signal is less than a specific threshold value, an integrity verification failure occurs in the SRB (or DRB), or a specified timer expires. The UF may compose an RRC connection reestablishment message as in the 1g-10 and transmit the composed RRC connection reestablishment message to the base station. Also, if the base station receiving the RRC connection reestablishment request message is a base station to which the UE has previously established a connection, the base station may compose an RRC connection reestablishment message and transmit the composed RRC connection reestablishment message to the UE (1g-11), and the UE may transmit an RRC reestablishment complete message to the base station to thereby reestablish a connection (1g-12).

However, if the base station is not a base station to which the UE has previously established a connection, the base station may transmit an RRCSetup message to establish a new connection with the UE (1g-22). Then, the UE may transmit an RRCSetupComplete message to the base station to thereby establish a new connection (1g-23). In addition, the UE may include in the RRCSetupComplete message a radio link failure (RLF) report or integrity verification failure information (e.g., an indicator or cell-related identifier indicating that integrity verification failure occurred, or a bearer identifier or logical channel identifier where integrity verification failure occurred, or information such as a COUNT value, occurrence time, or location of data in which the integrity verification failure occurred) or an indicator (available indication) that the UE has the radio link failure (RLF) report or integrity verification failure information. In another method, in the above, the base station may request the RLF report or integrity verification failure report from the UE through an RRC message, and the UE may constitute an RRC message in response to the request and report the contents.

The ciphering function, deciphering function, integrity protection function, or integrity verification function proposed in the disclosure may be extended and configured and used in a MAC layer device. For example, whether to use the ciphering function, deciphering function, integrity protection function, or integrity verification function for the MAC layer device may be configured as an indicator through the RRC message, respectively. In addition, when configuring the ciphering function or integrity protection function in the MAC layer device, separate security configuration information (e.g., a security key or a security algorithm) for the ciphering function or integrity protection function may be configured through the RRC message.

In the above, in the case that the ciphering function, deciphering function, integrity protection function, or integrity verification function is configured in the MAC layer device, the MAC layer device performs the integrity protection function or ciphering function on data or MAC control information received from an upper layer device, and may transmit the data by including the data in an uplink transmission resource. Also, the MAC layer device may perform the deciphering function or integrity verification function on the data or MAC control information received from a lower layer device, demultiplex the data or MAC control information and transmit the demultiplexed data or MAC control information to the upper layer device.

In the above, the data (e.g., MAC PDU) transmitted from the MAC layer device may have a structure in which upper layer data is placed at the very front, and MAC control information generated by the MAC layer device is placed at the very end, and in the case that an uplink transmission resource remains, the data may have a structure in which padding is added at the very end. For example, the data may have the following structure: [MAC header I upper layer data (e.g., MAC SDU)] [MAC header I upper layer data (e.g., MAC SDU)] . . . . [MAC header I upper layer data (e.g., MAC SDU)] [MAC header I MAC control information (e.g., BSR or PHR)] [MAC header I MAC control information (e.g., BSR or PHR)] . . . [MAC header I MAC control information (e.g., BSR or PHR)][MAC header for padding I Padding].

In the above structure, if the ciphering function or integrity protection function is configured in the MAC layer device, methods for efficiently performing the ciphering function or integrity protection function on the data (e.g., MAC PDU) are proposed as follows.

First method of applying a ciphering function or integrity protection function in a MAC layer device: If the ciphering function or integrity protection function is configured in the MAC layer device, the data (RLC PDU or MAC SDU) received from each logical channel (or an RLC layer device) and the MAC control information required to be transmitted by the MAC layer device are generated, and multiplexed as in the data (e.g., MAC PDU) structure described above, and then the ciphering function or integrity protection function may be applied to. the multiplexed data. For example, it is possible to generate a MAC header for each data (RLC PDU or MAC SDU), generate a MAC header for MAC control information, and apply the ciphering procedure to all multiplexed data (e.g., MAC PDU). Alternatively, the integrity protection procedure may be applied to the all data (e.g., MAC PDU), and the MAC-I field may be added and attached at the end of the all data. For example, in the case that the ciphering procedure or integrity protection procedure is applied as described above, the structure of the data (e.g., MAC PDU) transmitted from the MAC layer device or transmitted to the lower layer device may have the following structure of [MAC header I upper layer data (e.g., MAC SDU)] [MAC header I upper layer data (e.g., MAC SDU)] . . . [MAC header I upper layer data (e.g., MAC SDU)] [MAC header I MAC control information (e.g., BSR or PHR)] [MAC header I MAC control information (e.g., BSR or PHR)] . . . [MAC header I MAC control information (e.g., BSR or PHR)][MAC header for padding I Padding] [MAC-I field].

In another method, the MAC-I field may be located at the very front of the all data or may be included in the MAC header. In another method, the MAC layer device transmits the all data to the PDCP layer device of a specific bearer when performing the ciphering procedure or integrity protection procedure for the all data in the above, so that the ciphering procedure or integrity protection procedure for the all data is performed in the PDCP layer device. The PDCP layer device may transmit the data to which the ciphering procedure or integrity protection is applied to the MAC layer device, and the MAC layer device may transmit the data. The first method of applying the ciphering function or integrity protection function in the MAC layer device proposed above can have an advantage of reducing the overhead because the ciphering procedure or integrity protection procedure is applied to all data and only one MAC-I field is added. In the above, the ciphering procedure or integrity protection procedure may be applied to the MAC header for padding or padding data.

In another method, processing complexity may be reduced by not applying the ciphering procedure or integrity protection procedure to the MAC header for padding or padding data.

Second method of applying a ciphering function or integrity protection function in a MAC layer device: If the ciphering function or integrity protection function is configured in the MAC layer device, the ciphering function or integrity protection function may be applied for each data (RLC PDU or MAC SDU) received from each logical channel (or an RLC layer device). For example, it is possible to apply the ciphering procedure to the above each data (RLC PDU or MAC PDU). Alternatively, the integrity protection procedure may be applied to the above data and MAC header, and the MAC-I field may be added and attached at the end of the data. In addition, the ciphering procedure or integrity protection procedure can be applied to each MAC control information. In the case of applying the integrity protection procedure, the integrity protection procedure is applied to the MAC header and the MAC control information, and the MAC-I field may be added or attached at the end of the data. For example, in the case of applying the ciphering procedure or integrity protection procedure as described above, the data (e.g., MAC PDU) transmitted from the MAC layer device or transmitted to the lower layer device may have the following structure of [MAC header I upper layer data (e.g., MAC SDU) I MAC-I field] [MAC header I upper layer data (e.g., MAC SDU) I MAC-I field] . . . [MAC header I upper layer data (e.g., MAC SDU) I MAC-I field] [MAC header I MAC control information (e.g., BSR or PHR) I MAC-I field] [MAC header I MAC control information (e.g., BSR or PHR) I MAC-I field] . . . [MAC header I MAC control information (e.g., BSR or PHR)][MAC header for padding I padding I MAC-I field]. In another method, processing complexity may be reduced by not applying the ciphering procedure or integrity protection procedure to the MAC header for padding or padding data.

In another method, when performing the ciphering procedure or integrity protection procedure for each data (e.g., RLC PDU or MAC SDU) in the above, the MAC layer device transmits the data to the PDCP layer device of a specific bearer. The ciphering procedure or integrity protection procedure is performed in the PDCP layer device, the PDCP layer device transmits the data to which the ciphering procedure or integrity protection is applied to the MAC layer device, and the MAC layer device multiplexes the data to constitute the MAC PDU and transmit the constituted MAC PDU. The second method of applying the ciphering function or integrity protection function in the MAC layer device proposed above applies the ciphering function or integrity protection function to each upper layer device data (MAC SDU), so there is an advantage of performing the data processing in advance for each data. Since the same procedure can be repeatedly performed for each data, hardware implementation can be facilitated.

Third method of applying a ciphering function or integrity protection function in a MAC layer device: If the ciphering function or integrity protection function is configured in the MAC layer device, the ciphering function or integrity protection function may not be applied to each data (RLC PDU or MAC SDU) received from each logical channel (or an RLC layer device). However, since the MAC control information includes important information for controlling the MAC layer device or the PHY layer device, the ciphering procedure can be applied to the MAC control information or the integrity protection procedure can be applied to the MAC control information and the MAC header. When the ciphering procedure or integrity protection procedure is applied to the MAC control information in the above, the ciphering procedure or integrity protection procedure can be applied to all MAC control information or a group of MAC control information included in one MAC PDU at once. Therefore, the MAC-I field may be added and attached to the very end of the entire MAC control information. For example, in the case of applying the ciphering procedure or integrity protection procedure as described above, the data (e.g., MAC PDU) transmitted from the MAC layer device or transmitted to the lower layer device may have the following structure of [MAC header I upper layer data (e.g., MAC SDU)] [MAC header I upper layer data (e.g., MAC SDU)] . . . [MAC header I upper layer data (e.g., MAC SDU)] [MAC header I MAC control information (e.g., BSR or PHR)] [MAC header I MAC control information (e.g., BSR or PHR)] . . . [MAC header I MAC control information (e.g., BSR or PHR)][MAC header for padding I Padding] [MAC-I field]. In the above, the ciphering or integrity protection procedure may be applied including the header for padding or padding.

In another method, processing complexity may be reduced by not applying the ciphering procedure or integrity protection procedure to the MAC header for padding or padding data. In another method, the MAC layer device transmits the data to the PDCP layer device of a specific bearer when performing the ciphering procedure or integrity protection procedure on the MAC control information, and the ciphering procedure or integrity protection procedure for the MAC control information is performed in the PDCP layer device. The PDCP layer device transmits the MAC control information to which the ciphering procedure or integrity protection is applied to the MAC layer device, and the MAC layer device multiplexes the MAC control information with other data to constitute the MAC PDU and transmits the constituted MAC PDU. Since the third method of applying the ciphering function or integrity protection function in the MAC layer device proposed above applies the ciphering function or integrity protection function to a group of MAC control information or the entire MAC control information, overhead due to the MAC-I field can be reduced. In the above, the MAC-I field may be located at the very front of the MAC control information, at the very front of the MAC PDU, or included in the MAC header. For example, if the MAC-I field is located at the very front, the receiving terminal can identify the MAC-I field value first, thereby shortening the processing time.

Fourth method of applying a ciphering function or integrity protection function in a MAC layer device: If the ciphering function or integrity protection function is configured in the MAC layer device, the ciphering function or integrity protection function may not be applied to each data (RLC PDU or MAC SDU) received from each logical channel (or an RLC layer device). However, since the MAC control information includes important information for controlling the MAC layer device or the PHY layer device, the ciphering procedure can be applied to each MAC control information, or the integrity protection procedure may be applied for each MAC control information and each MAC header. In the above, when the ciphering procedure or integrity protection procedure is applied to the MAC control information, the ciphering procedure or integrity protection procedure may be applied to each MAC control information included in one MAC PDU, respectively. Therefore, the MAC-I field can be added and attached at the end (or front) of each MAC control information. For example, in the case of applying the ciphering procedure or integrity protection procedure as described above, the data (e.g., MAC PDU) transmitted from the MAC layer device or transmitted to the lower layer device may have the following structure of [MAC header I upper layer data (e.g., MAC SDU)] [MAC header I upper layer data (e.g., MAC SDU)] . . . . [MAC header I upper layer data (e.g., MAC SDU)] [MAC header I MAC control information (e.g., BSR or PHR) I MAC-I field] [MAC header I MAC control information (e.g., BSR or PHR) I MAC-I field] . . . [MAC header I MAC control information (e.g., BSR or PHR) I MAC-I field] [MAC header for padding I padding]. In the above, the ciphering or integrity protection procedure may be applied including a header for padding or padding.

In another method, processing complexity may be reduced by not applying the ciphering procedure or integrity protection procedure to the MAC header for padding or padding data. In another method, the MAC layer device transmits the MAC control information to the PDCP layer device of a specific bearer when performing the ciphering procedure or integrity protection procedure on the MAC control information in the above, so that the ciphering procedure or integrity protection procedure for the MAC control information is performed in the PDCP layer device. The PDCP layer device transmits the MAC control information to which the ciphering procedure or integrity protection is applied to the MAC layer device, and the MAC layer device multiplexes the MAC control information with other data to constitute the MAC PDU and transmits the constituted MAC PDU. The fourth method of applying the ciphering function or integrity protection function in the MAC layer device proposed above applies the ciphering function or integrity protection function to each MAC control information, so that there is an advantage in that data processing can be performed in advance for each MAC control information, and since the same procedure can be repeatedly performed for each MAC control information, hardware implementation can be facilitated. In the above, the MAC-I field may be located at the very front of the MAC control information or included in the MAC header. For example, if the MAC-I field is located at the very front of the MAC control information, the receiving terminal can identify the MAC-I field value first, thereby shortening the processing time.

In the above, in the case that the transmitting PDCP layer device (or a MAC layer device) is configured with all of the integrity protection function, integrity verification function, ciphering function, and deciphering function, the integrity protection procedure may be performed for the upper layer device data or MAC control information or a corresponding PDCP header (or a MAC header), and the ciphering procedure may be performed together for the upper layer device data and the MAC-I field generated by the integrity protection procedure. In the above, the transmitting PDCP layer device performs the same procedure as above for SDAP user data (SDAP data PDU), and in the case that the SDAP header is configured, the integrity protection procedure is applied to the SDAP header, and the ciphering procedure may not be applied to the SDAP header. Also, in the above, the transmitting PDCP layer device may apply the integrity protection procedure to the SDAP control data (SDAP control PDU) and may not apply the ciphering procedure to the SDAP control data. In addition, in the above, the transmitting PDCP layer device may not apply the integrity protection procedure nor the ciphering procedure to the PDCP control data (PDCP control PDU). In the case that the integrity protection function, integrity verification function, ciphering function, and deciphering function are all configured in the MAC layer device, the methods for applying the ciphering function or integrity protection function in the MAC layer device proposed above may be applied. In the above, when the receiving PDCP layer device receives data from a lower layer device, the receiving PDCP layer device may apply the deciphering procedure or perform an integrity verification procedure. If the indicator indicated in the PDCP header indicates the PDCP control data, the above procedures may not be applied. If the indicator indicated in the SDAP header indicates the SDAP control data, the deciphering procedure may not be performed and the integrity verification procedure may be performed.

In the above, when the MAC layer device receives data from the lower layer device, the MAC layer device may apply the deciphering procedure or perform the integrity verification procedure. According to the methods of applying the ciphering function or integrity protection function in the MAC layer device proposed above, the MAC layer device may identify the MAC header, and may determine whether or not to apply the deciphering procedure or integrity verification procedure to the MAC SDU or MAC control information. For example, in the third method or the fourth method in which the MAC layer device applies the ciphering function or integrity protection function, the MAC layer device reads the MAC header and applies the deciphering procedure or integrity verification procedure only to the MAC control information.

In addition, the receiving PDCP layer device may not apply the above procedures if the indicator indicated in the PDCP header indicates the PDCP control data. If the indicator indicated in the SDAP header indicates the SDAP control data, the deciphering procedure may not be performed and the integrity verification procedure may be performed. In another method, the disclosure proposes that neither integrity protection nor ciphering procedure is applied to the SDAP control data in order to simplify implementation through unified data processing. In another method, the integrity protection or ciphering procedures may also be applied to the SDAP control data.

The disclosure proposed above can be extended to the case where the base station broadcasts system information, and after applying the ciphering or integrity protection procedure to the system information, the ciphered or integrity-protected system information can be broadcast. In an IDLE mode state or INACTIVE mode state, if the UE receives system information from a camped-on cell (e.g., a suitable cell) and the integrity verification procedure for the received system information fails, the UE leaves the camped-on cell and may perform a cell selection procedure or cell reselection procedure again. Alternatively, when performing the cell selection procedure or cell reselection procedure in the above, the cell selection procedure or cell reselection procedure may be performed except for the cell (or frequency) that broadcasts the system information that has failed the integrity verification procedure. Because the signal strength of the base station that induces terminal access with wrong system information with malicious intent will always be strong, the base station is excluded from the cell selection or reselection procedure to prevent the UE from accessing the malicious base station, so that security can be improved.

Figure 8:
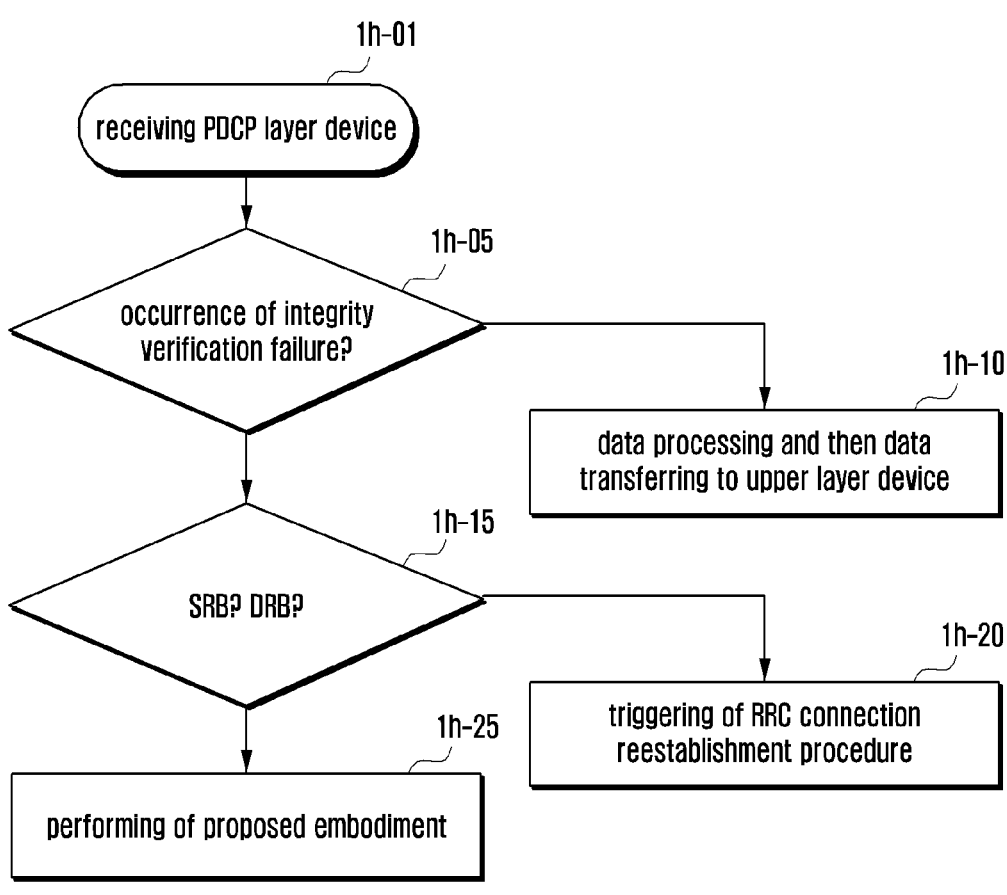
FIG. 8 is a diagram illustrating operations of a receiving PDCP layer device proposed in the disclosure.

FIG. 8 is a diagram illustrating operations of a receiving PDCP layer device proposed in the disclosure.

In FIG. 8, the receiving PDCP layer device may perform an integrity verification procedure on received data, and if an integrity verification failure does not occur (1h-05), it may process the data and deliver the data to an upper layer device (1h-10). However, if an integrity verification failure has occurred (1h-15), in the case that an integrity verification failure has occurred for the SRB according to the methods or embodiments proposed in the disclosure, the corresponding proposed UE operation may be performed for the SRB (1h-20). Alternatively, in the case that an integrity verification failure has occurred for the DRB, the corresponding proposed UE operation may be performed for the DRB (1h-25).

Figure 9:
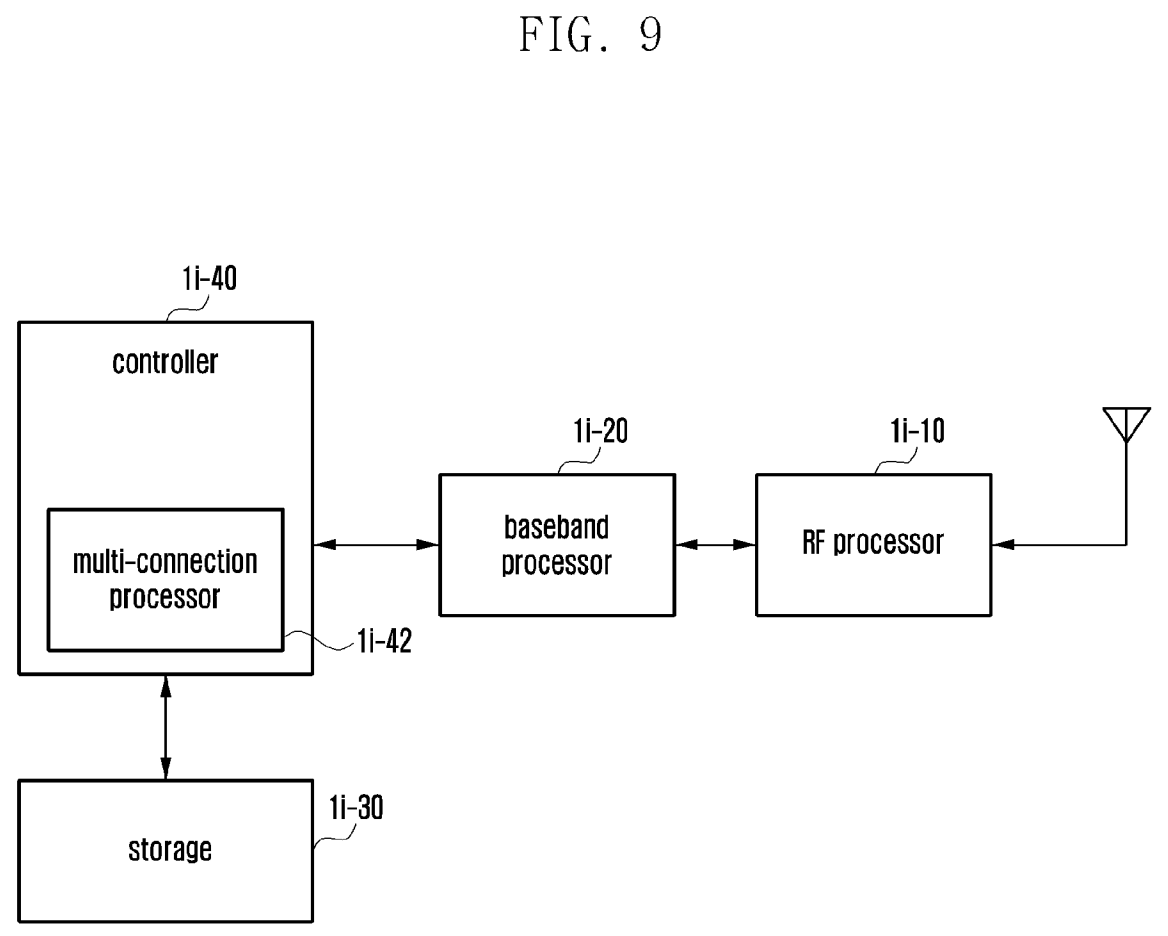

FIG. 9 is a diagram illustrating a structure of a terminal to which an embodiment of the disclosure is applicable.

With reference to the drawing, the terminal includes a radio frequency (RF) processor 1i-10, a baseband processor 1i-20, a storage 1i-30, and a controller 1i-40.

The RF processor 1i-10 performs a function for transmitting and receiving a signal through a radio channel, such as signal band conversion and amplification. That is, the RF processor 1i-10 performs up-conversion of a baseband signal provided from the baseband processor 1i-20 into an RF-band signal to transmit the converted signal to an antenna, and performs down-conversion of the RF-band signal received through the antenna into a baseband signal. For example, the RF processor 1i-10 may include a transmission filter, a reception filter, an amplifier, a mixer, an oscillator, a digital to analog convertor (DAC), an analog to digital convertor (ADC), and the like. Although only one antenna is illustrated, the terminal may be provided with a plurality of antennas. Also, the RF processor 1i-10 may include a plurality of RF chains. Further, the RF processor 1i-10 may perform beamforming. For the beamforming, the RF processor 1i-10 may adjust phases and sizes of signals transmitted or received through the plurality of antennas or antenna elements. Also, the RF processor may perform MIMO, and may receive several layers during performing of a MIMO operation. The RF processor 1i-10 may appropriately configure a plurality of antennas or antenna components according to the control of the controller so as to perform reception beam sweeping, or may control the orientation of a reception beam and a beam width such that a reception beam accords with a transmission beam.

The baseband processor 1i-20 performs a function for conversion between a baseband signal and a bit string in accordance with the physical layer standard of the system. For example, during data transmission, the baseband processor 1i-20 generates complex symbols by encoding and modulating a transmitted bit string. Also, during data reception, the baseband processor 1i-20 restores a received bit string by demodulating and decoding the baseband signal provided from the RF processor 1i-10. For example, in the case of following orthogonal frequency division multiplexing (OFDM) method, during data transmission, the baseband processor 1i-20 generates complex symbols by encoding and modulating a transmitted bit string, performs mapping of the complex symbols on subcarriers, and then constitutes OFDM symbols through an inverse fast Fourier transform (IFFT) operation and a cyclic prefix (CP) insertion. Also, during data reception, the baseband processor 1i-20 divides the baseband signal provided from the RF processor 1i-10 in the unit of OFDM symbols, restores the signals mapped on the subcarriers through a fast Fourier transform (FFT) operation, and then restores the received bit string through demodulation and decoding.

The baseband processor 1*i*-20 and the RF processor 1*i*-10 transmit and receive the signals as described above. Accordingly, the baseband processor 1*i*-20 and the RF processor 1*i*-10 may be called a transmitter, a receiver, a transceiver, or a communication unit. Further, in order to support different radio connection technologies, at least one of the baseband processor 1*i*-20 and the RF processor 1*i*-10 may include a plurality of communication modules. Also, in order to process signals of different frequency bands, at least one of the baseband processor 1*i*-20 and the RF processor 1*i*-10 may include different communication modules. For example, the different radio connection technologies may include an LTE network, an NR network, etc. Also, the different frequency bands may include a super high frequency (SHF) (e.g., 2.2 gHz, 2 ghz) band and millimeter wave (mmWave) (e.g., 60 GHz) band.

The storage 1*i*-30 stores a basic program for an operation of the terminal, application programs, and data such as data of configuration information. The storage 1*i*-30 provides stored data in accordance with a request from the controller 1*i*-40.

The controller 1*i*-40 controls the operation of the terminal. For example, the controller 1*i*-40 transmits and receives signals through the baseband processor 1*i*-20 and the RF processor 1*i*-10. Also, the controller 1*i*-40 records or reads data in or from the storage 1*i*-30. To this end, the controller 1*i*-40 may include at least one processor For example, the controller 1*i*-40 may include a communication processor (CP) performing a control for communication and an application processor (AP) controlling an upper layer, such as an application program.

Figure 10:
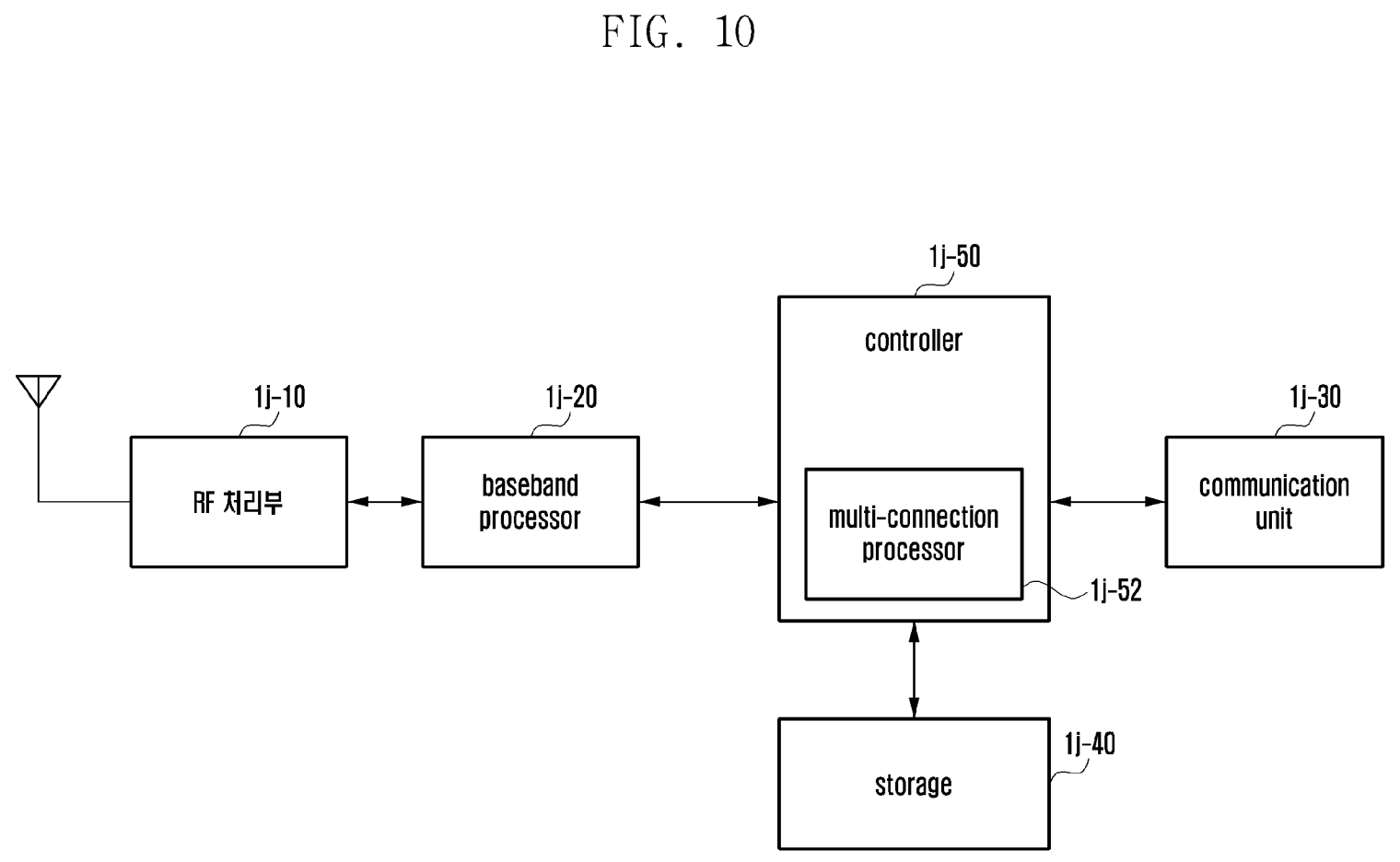

FIG. 10 illustrates a block diagram of a TRP (e.g., a base station) in a wireless communication system to which an embodiment of the disclosure is applicable.

As illustrated in the drawing, the base station is constituted to include an RF processor 1*j*-10, a baseband processor 1*j*-20, a backhaul communication unit 1*j*-30, a storage 1*j*-40, and a controller 1*j*-50.

The RF processor 1*j*-10 performs a function for transmitting and receiving a signal through a radio channel, such as signal band conversion and amplification. That is, the RF processor 1*j*-10 performs up-conversion of a baseband signal provided from the baseband processor 1*j*-20 into an RF-band signal to transmit the converted signal to an antenna, and performs down-conversion of the RF-band signal received through the antenna into a baseband signal. For example, the RF processor 1*j*-10 may include a transmission filter, a reception filter, an amplifier, a mixer, an oscillator, a DAC, an ADC, and the like. Although only one antenna is illustrated in the drawing, a first access node may include a plurality of antennas. Also, the RF processor 1*j*-10 may include a plurality of RF chains. Further, the RF processor 1*j*-10 may perform beamforming. For the beamforming, the RF processor 1*j*-10 may adjust phases and sizes of each of signals transmitted or received through the plurality of antennas or antenna components. The RF processor may perform down MIMO operation through transmission of one or more layers.

The baseband processor 1*j*-20 performs a function of converting between a baseband signal and a bit string in accordance with the physical layer standard of a first radio access technology. For example, during data transmission, the baseband processor 1*j*-20 generates complex symbols by encoding and modulating a transmitted bit string. Also, during data reception, the baseband processor 1*j*-20 restores a received bit string by demodulating and decoding the baseband signal provided from the RF processor 1*j*-10. For example, in the case of following an OFDM method, during data transmission, the baseband processor 1*j*-20 generates complex symbols by encoding and modulating a transmitted bit string, performs mapping of the complex symbols on subcarriers, and then constitutes OFDM symbols through the IFFT operation and CP insertion. Also, during data reception, the baseband processor 1*j*-20 divides the baseband signal provided from the RF processor 1*j*-10 in the unit of OFDM symbols, restores the signals mapped on the subcarriers through the FFT operation, and then restores the received bit string through demodulation and decoding. The baseband processor 1*j*-20 and the RF processor 1*j*-10 transmit and receive the signals as described above. Accordingly, the baseband processor 1*j*-20 and the RF processor 1*j*-10 may be called a transmitter, a receiver, a transceiver, or a wireless communication unit.

The communication unit 1*j*-30 provides an interface for performing communication with other nodes in the network.

The storage 1*j*-40 stores a basic program for an operation of the main base station, application programs, and data such as data of configuration information. Particularly, the storage 1*j*-40 may store information on a bearer allocated to the accessed terminal, the measurement result reported from the accessed terminal, and the like. Also, the storage 1*j*-40 may store information that becomes a basis of determination whether to provide or suspend a multi-access to the terminal. Further, the storage 1*j*-40 provides stored data in accordance with a request from the controller 1*j*-50.

The controller 1*j*-50 controls the overall operation of the main base station. For example, the controller 1*j*-50 transmits and receives signals through the baseband processor 1*j*-20 and the RF processor 1*j*-10 or through the backhaul communication unit 1*j*-30. Also, the controller 1*j*-50 records or reads data in or from the storage 1*j*-40. To this end, the controller 1*j*-50 may include at least one processor.

In the embodiments of the disclosure described above, the components included in the disclosure have been expressed in the singular or plural form according to the suggested embodiments of the disclosure. However, the expression in the singular or plural form is appropriately selected according to the suggested situations for convenience of explanation and is not intended to limit the disclosure to the single or plural elements, and even when a certain component is expressed in the plural form, it may be provided with a single component, and even when a certain component is expressed in the singular form, it may be provided with a plurality of components.

Although certain embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

The invention claimed is:

1. A method performed by a transmission device in a wireless communication system, the method comprising:
    transmitting, to a reception device, a first message including configuration information to configure an integrity protection function for a data radio bearer (DRB);
    transmitting, to the reception device, first packets on the DRB based on the configuration information;

transmitting, to the reception device, a second message including reconfiguration information to release a configuration of the integrity protection function for the DRB; and transmitting, to the reception device, second packets on the DRB based on the reconfiguration information, wherein a message authentication code for integrity (MAC-I) field is transmitted with the first packets and control information is transmitted with the second packets, and wherein the control information includes information indicating a packet data convergence protocol (PDCP) sequence number of first data where a presence or an absence of the MAC-I field is changed among the second packets.

2. The method of claim 1, wherein a header of each second packet includes information indicating whether to transmit the MAC-I field.

3. The method of claim 1, wherein the first message further includes configuration information to configure the integrity protection function for a signaling radio bearer (SRB), wherein the second message further includes reconfiguration information to release a configuration of the integrity protection function for the SRB, and wherein packets are transmitted with a MAC-I field including padding bits set to 0 to the reception device on the SRB after a transmission of the second message.

4. The method of claim 1, further comprising:

receiving, from the reception device, a report of an integrity verification failure for the first packets; and transmitting, to the reception device, a third message as a response to the report, wherein the third message indicates a radio resource control (RRC) connection reestablishment for the DRB or a release of the DRB.

5. A method performed by a reception device in a wireless communication system, the method comprising:

receiving, from a transmission device, a first message including configuration information to configure an integrity protection function or a data radio bearer (DRB);

receiving, from the transmission device, first packets on the DRB based on the configuration information;

receiving, from the transmission device, a second message including reconfiguration information to release a configuration of the integrity protection function for the DRB; and receiving, from the transmission device, second packets on the DRB, based on the reconfiguration information, wherein a message authentication code for integrity (MAC-I) field is received with the first packets and control information is received with the second packets, and wherein the control information includes information indicating a packet data convergence protocol (PDCP) sequence number of first data where a presence or an absence of the MAC-I field is changed among the second packets.

6. The method of claim 5, wherein a header of each second packet includes information indicating whether to transmit the MAC-I field.

7. The method of claim 5, wherein the first message further includes configuration information to configure the integrity protection function for a signaling radio bearer (SRB), wherein the second message further includes reconfiguration information indicating a to release a configuration of the integrity protection function for the SRB, and wherein packets are received with a MAC-I field including padding bits set to 0 from the transmission device on the SRB after a reception of the second message.

8. The method of claim 5, further comprising:

performing an integrity verification for the first packets;

transmitting, to the transmission device, a report of an integrity verification failure, in case that the integrity verification failure is identified; and receiving, from the transmission device, a third message as a response to the report, wherein the integrity verification failure is identified, in case that a number of the integrity verification failure is more than a predetermined number, and wherein the third message indicates a radio resource control (RRC) connection reestablishment for the DRB or a release of the DRB.

9. A transmission device in a wireless communication system, the transmission device comprising:

a transceiver; and a controller configured to:

control the transceiver to transmit, to a reception device, a first message including configuration information to configure an integrity protection function for a data radio bearer (DRB), control the transceiver to transmit, to the reception device, first packets on the DRB based on the configuration information, control the transceiver to transmit, to the reception device, a second message including reconfiguration information to release a configuration of the integrity protection function for the DRB, and control the transceiver to transmit, to the reception device, second packets on the DRB based on the reconfiguration information, wherein a message authentication code for integrity (MAC-I) field is transmitted with the first packets and control information is transmitted with the second packets, and wherein the control information includes information indicating a packet data convergence protocol (PDCP) sequence number of first data where a presence or an absence of the MAC-I field is changed among the second packets.

10. The transmission device of claim 9, wherein a header of each second packet includes information indicating whether to transmit the MAC-I field.

11. The transmission device of claim 9, wherein the first message further includes configuration information to configure the integrity protection function for a signaling radio bearer (SRB), wherein the second message further includes reconfiguration information to release a configuration of the integrity protection function for the SRB, and wherein packets are transmitted with a MAC-I field including padding bits set to 0 to the reception device on the SRB, after a transmission of the second message.

12. The transmission device of claim 9, wherein the controller is further configured to control the transceiver to receive, from the reception device, a report of an integrity verification failure for the first packets, and control the transceiver to transmit, to the reception device, a third message as a response to the report, and wherein the third message indicates a radio resource control (RRC) connection reestablishment for the DRB or a release of the DRB.

13. A reception device in a wireless communication system, the reception device comprising:

a transceiver; and a controller configured to:

control the transceiver to receive, from a transmission device, a first message including configuration information to configure an integrity protection function for a data radio bearer (DRB), control the transceiver to receive, from the transmission device, first packets on the DRB based on the configuration information, control the transceiver to receive, from the transmission device, a second message including reconfiguration information to release a configuration of the integrity protection function for the DRB, and control the transceiver to receive, from the transmission device, second packets on the DRB, based on the reconfiguration information, wherein a message authentication code for integrity (MAC-I) field is received with the first packets and control information is received with the second packets, and wherein the control information includes information indicating a packet data convergence protocol (PDCP)

sequence number of first data where a presence or an absence of the MAC-I field is changed among the second packets.

14. The reception device of claim 13, wherein a header of each second packet includes information indicating whether to transmit the MAC-I field, wherein the first message further includes configuration information to configure the integrity protection function for a signaling radio bearer (SRB), wherein the second message further includes reconfiguration information to release a configuration of the integrity protection function for the SRB, and wherein packets are received with a MAC-I field including padding bits set to 0 from the transmission device on the SRB after a reception of the second message.

15. The reception device of claim 13, wherein the controller is further configured to perform an integrity verification for the first packets, control the transceiver to transmit, to the transmission device, a report of an integrity verification failure, in case that the integrity verification failure is identified, and control the transceiver to receive, from the transmission device, a third message as a response to the report, wherein the integrity verification failure is identified, in case that a number of the integrity verification failure is more than a predetermined number, and wherein the third message indicates a radio resource control (RRC) connection reestablishment for the DRB or a release of the DRB.

* * * * *